US012647392B2

(12) United States Patent
Bansal et al.

(10) Patent No.: US 12,647,392 B2
(45) Date of Patent: Jun. 2, 2026

(54) DISASTER RECOVERY FOR CLOUD-BASED MONITORING OF INTERNET ACCESS

(71) Applicant: Zscaler, Inc., San Jose, CA (US)

(72) Inventors: Abhinav Bansal, San Jose, CA (US);
Paul Yun Ling, San Jose, CA (US);
Vikas Mahajan, Ludhiana (IN)

(73) Assignee: Zscaler, Inc., San Jose, CA (US)

( * ) Notice: Subject to any disclaimer, the term of this patent is extended or adjusted under 35 U.S.C. 154(b) by 294 days.

(21) Appl. No.: 18/307,303

(22) Filed: Apr. 26, 2023

(65) Prior Publication Data

US 2023/0262030 A1 Aug. 17, 2023

Related U.S. Application Data

(63) Continuation-in-part of application No. 17/154,139, filed on Jan. 21, 2021, now Pat. No. 11,962,589, which is a continuation-in-part of application No. 16/922,353, filed on Jul. 7, 2020, now Pat. No. 11,533,307.

(30) Foreign Application Priority Data

Mar. 13, 2023 (IN) .............................. 202311016582

(51) Int. Cl.
*H04L 9/40* (2022.01)
*G06F 11/07* (2006.01)

(52) U.S. Cl.
CPC ...... *H04L 63/0254* (2013.01); *G06F 11/0709* (2013.01); *G06F 11/0793* (2013.01)

(58) Field of Classification Search
CPC ............. H04L 63/0254; G06F 11/0709; G06F 11/0793
See application file for complete search history.

(56) References Cited

U.S. PATENT DOCUMENTS

| | | | |
|---|---|---|---|
| 7,693,059 B2 | 4/2010 | Osenbach et al. | |
| 8,464,335 B1 | 6/2013 | Sinha et al. | |
| 8,495,737 B2 | 7/2013 | Sinha et al. | |
| 8,695,059 B2 | 4/2014 | Kopti | |
| 8,763,071 B2 | 6/2014 | Sinha et al. | |
| 8,955,091 B2 | 2/2015 | Kailash et al. | |
| 9,019,962 B1 | 4/2015 | Ghosh | |
| 9,065,800 B2 | 6/2015 | Devarajan et al. | |
| 9,350,710 B2 | 5/2016 | Herle et al. | |
| 9,473,537 B2 | 10/2016 | Sinha et al. | |
| 9,479,357 B1 * | 10/2016 | Fu ....................... | H04W 12/128 |

(Continued)

OTHER PUBLICATIONS

Network-Independent Support for Using Multiple IP Interface in Applications, IEEE Conference Paper, 2011 Conference on Network and Information Systems Security, Famulari, A, Hecker, A. Abstract Only (Year: 2011).

(Continued)

*Primary Examiner* — Harris C Wang
(74) *Attorney, Agent, or Firm* — Baratta Law PLLC; Lawrence A. Baratta, Jr.; Ryan Odessa

(57) ABSTRACT

Systems and methods include receiving one or more disaster recovery configurations; identifying activation of a disaster recovery mode; and controlling traffic flow such that the traffic is any of blocked to all destinations, allowed to all destinations, and allowed to preselected destinations based on the one or more received disaster recovery configurations.

20 Claims, 23 Drawing Sheets

(56) References Cited

U.S. PATENT DOCUMENTS

| | | | |
|---|---|---|---|
| 9,531,758 | B2 | 12/2016 | Devarajan et al. |
| 9,609,460 | B2 | 3/2017 | Sinha |
| 9,621,574 | B2 | 4/2017 | Desai et al. |
| 9,912,638 | B2 | 3/2018 | Kailash et al. |
| 9,935,955 | B2 | 4/2018 | Desai et al. |
| 10,142,362 | B2 | 11/2018 | Weith et al. |
| 10,237,286 | B2 | 3/2019 | Sharma et al. |
| 10,243,997 | B2 | 3/2019 | Desai et al. |
| 10,375,024 | B2 | 8/2019 | Foxhoven et al. |
| 10,419,477 | B2 | 9/2019 | Desai et al. |
| 10,498,605 | B2 | 12/2019 | Weith et al. |
| 10,511,590 | B1 | 12/2019 | Bosch et al. |
| 10,616,180 | B2 | 4/2020 | Chanak et al. |
| 10,728,117 | B1 | 7/2020 | Sharma et al. |
| 10,728,287 | B2 | 7/2020 | Foxhoven et al. |
| 10,749,907 | B2 | 8/2020 | Sinha et al. |
| 11,526,403 | B1* | 12/2022 | Ruslyakov .......... G06F 11/2097 |
| 11,962,589 | B2* | 4/2024 | Foxhoven ............... H04L 67/51 |
| 2010/0027549 | A1 | 2/2010 | Satterlee et al. |
| 2010/0125903 | A1 | 5/2010 | Devarajan et al. |
| 2010/0306486 | A1* | 12/2010 | Balasubramanian ........................ G06F 11/1458 711/E12.001 |
| 2012/0281706 | A1 | 11/2012 | Agarwal et al. |
| 2013/0061306 | A1 | 3/2013 | Sinn |
| 2014/0020062 | A1 | 1/2014 | Tumula et al. |
| 2015/0135302 | A1 | 5/2015 | Cohen et al. |
| 2015/0282041 | A1 | 10/2015 | Batchu et al. |
| 2015/0317194 | A1* | 11/2015 | Sampath ............... G06F 11/008 714/703 |
| 2016/0142374 | A1 | 5/2016 | Clark |
| 2017/0091472 | A1* | 3/2017 | Glading .............. G06F 11/0793 |
| 2017/0279803 | A1 | 9/2017 | Desai et al. |
| 2017/0286236 | A1* | 10/2017 | Protasov ............. H04L 12/4641 |
| 2017/0331859 | A1 | 11/2017 | Bansal et al. |
| 2018/0113807 | A1 | 4/2018 | Foxhoven et al. |
| 2018/0288062 | A1 | 10/2018 | Goyal et al. |
| 2018/0343316 | A1* | 11/2018 | Meyer ................... H04L 67/562 |
| 2018/0357294 | A1 | 12/2018 | Zhang |
| 2019/0068617 | A1* | 2/2019 | Coleman ............. H04L 63/0876 |
| 2019/0141015 | A1* | 5/2019 | Nellen ................ H04L 63/0272 |
| 2019/0268379 | A1 | 8/2019 | Narayanaswamy et al. |
| 2020/0274783 | A1 | 8/2020 | Sharma et al. |
| 2020/0274784 | A1 | 8/2020 | Sharma et al. |
| 2020/0358669 | A1 | 11/2020 | Sinha et al. |
| 2020/0402065 | A1 | 12/2020 | Kapur et al. |
| 2021/0034992 | A1* | 2/2021 | Mukeri ................. G06F 11/302 |
| 2022/0103594 | A1* | 3/2022 | Galloway ........... H04L 63/0272 |
| 2022/0210197 | A1* | 6/2022 | Vaner et al. ............ H04L 63/20 |
| 2022/0360562 | A1* | 11/2022 | Hanes ................. H04L 63/0263 |

OTHER PUBLICATIONS

Multipath cloud federation Publication Date: Sep. 1, 2017, Electronic Publication Date: Oct. 18, 2017 Published in: 2017 IEEE 6th International Conference on Cloud Networking (CioudNet) (pp. 1-6), Mael Kimmerlin, Peer Hasselmeyer, Andreas Ripke, Abstract Only (Year: 2017).

Tsunami: A parasitic, indestructible botnet on Kad, Author: Memon, Ghulam; Li, Jun; Rejaie, Reza, Abstract Only Publication info: Peer-To-Peer Networking and Applications 7.4: 444-455, Springer Science & Business Media, (Dec. 2014) (Year: 2014).

A cluster-based countermeasure against blackhole attacks in MANETs, Author: Shi, Fei; Liu, Weijie; Jin, Dongxu; Song, Jooseok, Abstract Only, Publication info: Telecommunication Systems 57.2: 119-136. Springer Science & Business Media. (Oct. 2014) (Year: 2014)

Remote access VPNs: Selection and deployment issues, Author: King, Christopher M, Abstract Only Publication info: Business Communications Review 30.6: 52-56. UBM LLC. (Jun. 2000) (Year: 2000).

* cited by examiner

Figure 12:
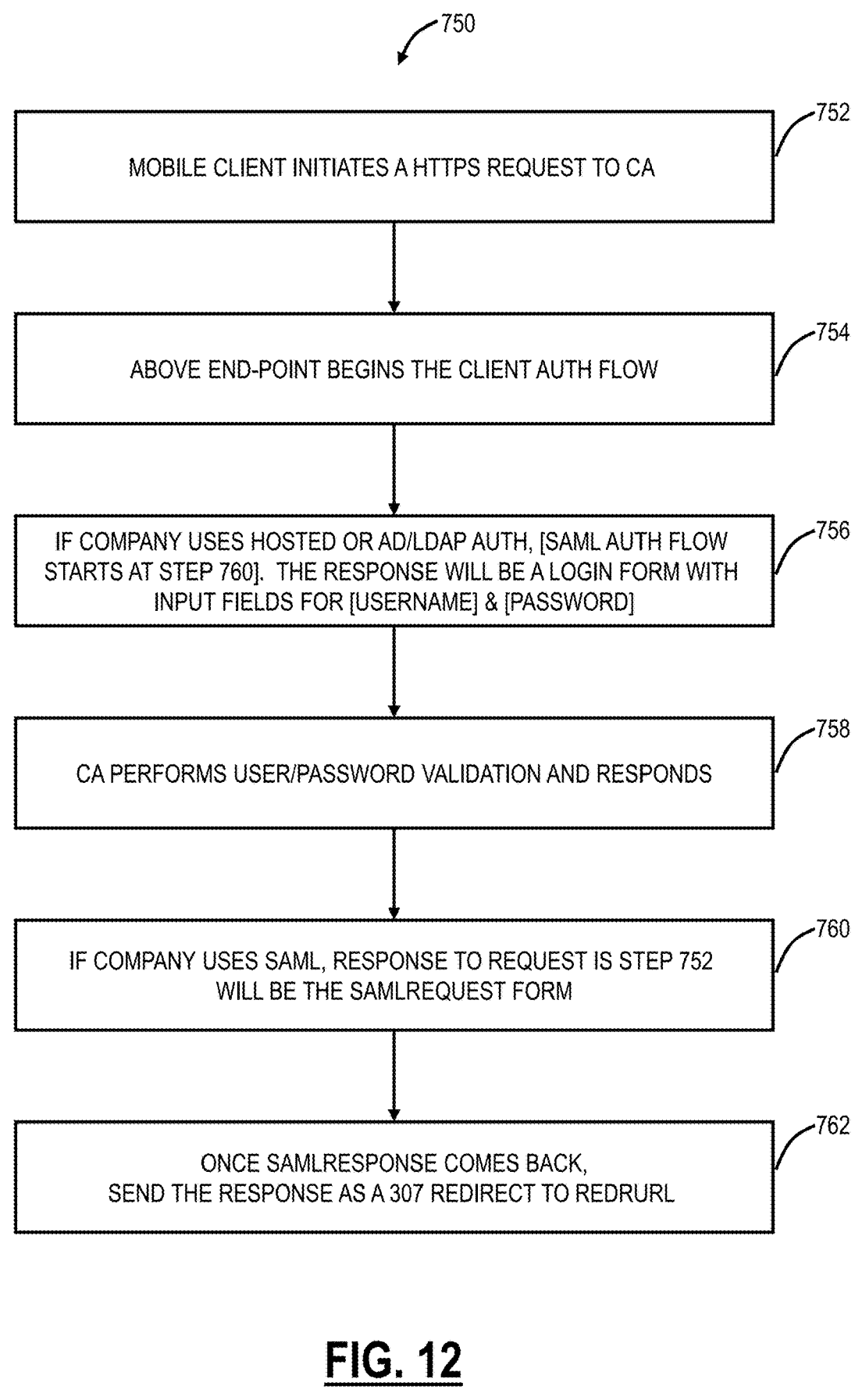

750

752

MOBILE CLIENT INITIATES A HTTPS REQUEST TO CA

754

ABOVE END-POINT BEGINS THE CLIENT AUTH FLOW

756

IF COMPANY USES HOSTED OR AD/LDAP AUTH, [SAML AUTH FLOW STARTS AT STEP 760]. THE RESPONSE WILL BE A LOGIN FORM WITH INPUT FIELDS FOR [USERNAME] & [PASSWORD]

758

CA PERFORMS USER/PASSWORD VALIDATION AND RESPONDS

760

IF COMPANY USES SAML, RESPONSE TO REQUEST IS STEP 752 WILL BE THE SAMLREQUEST FORM

762

ONCE SAMLRESPONSE COMES BACK, SEND THE RESPONSE AS A 307 REDIRECT TO REDRURL

Figure 13:
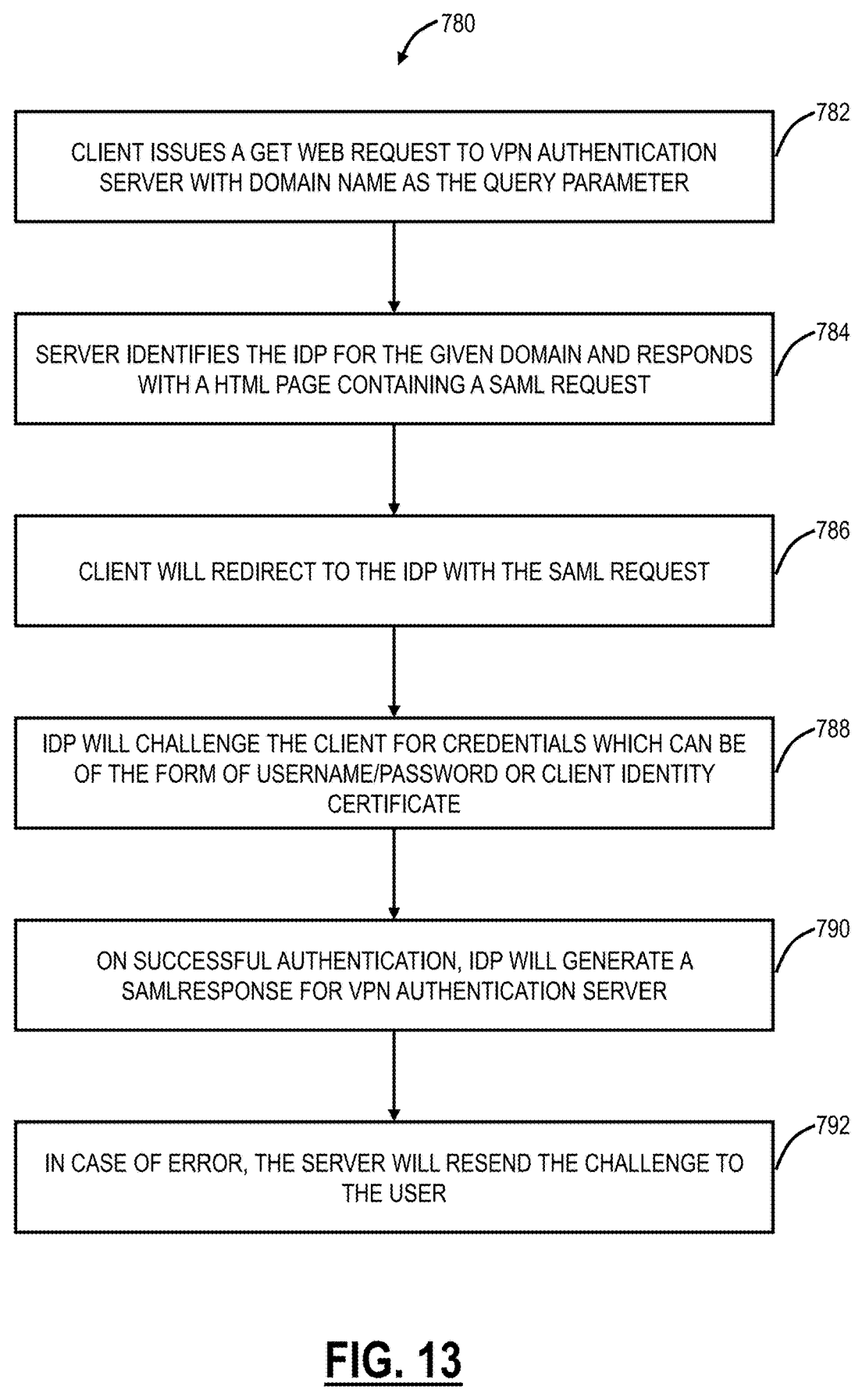

┌─────────────────────────────────────────────────────────────┐
│ CLIENT ISSUES A GET WEB REQUEST TO VPN AUTHENTICATION        │ ⟋782
│ SERVER WITH DOMAIN NAME AS THE QUERY PARAMETER               │
└─────────────────────────────────────────────────────────────┘
                              │
                              ▼
┌─────────────────────────────────────────────────────────────┐
│ SERVER IDENTIFIES THE IDP FOR THE GIVEN DOMAIN AND RESPONDS  │ ⟋784
│ WITH A HTML PAGE CONTAINING A SAML REQUEST                   │
└─────────────────────────────────────────────────────────────┘
                              │
                              ▼
┌─────────────────────────────────────────────────────────────┐
│ CLIENT WILL REDIRECT TO THE IDP WITH THE SAML REQUEST        │ ⟋786
└─────────────────────────────────────────────────────────────┘
                              │
                              ▼
┌─────────────────────────────────────────────────────────────┐
│ IDP WILL CHALLENGE THE CLIENT FOR CREDENTIALS WHICH CAN BE   │ ⟋788
│ OF THE FORM OF USERNAME/PASSWORD OR CLIENT IDENTITY          │
│ CERTIFICATE                                                  │
└─────────────────────────────────────────────────────────────┘
                              │
                              ▼
┌─────────────────────────────────────────────────────────────┐
│ ON SUCCESSFUL AUTHENTICATION, IDP WILL GENERATE A            │ ⟋790
│ SAMLRESPONSE FOR VPN AUTHENTICATION SERVER                   │
└─────────────────────────────────────────────────────────────┘
                              │
                              ▼
┌─────────────────────────────────────────────────────────────┐
│ IN CASE OF ERROR, THE SERVER WILL RESEND THE CHALLENGE TO    │ ⟋792
│ THE USER                                                     │
└─────────────────────────────────────────────────────────────┘

Figure 14:
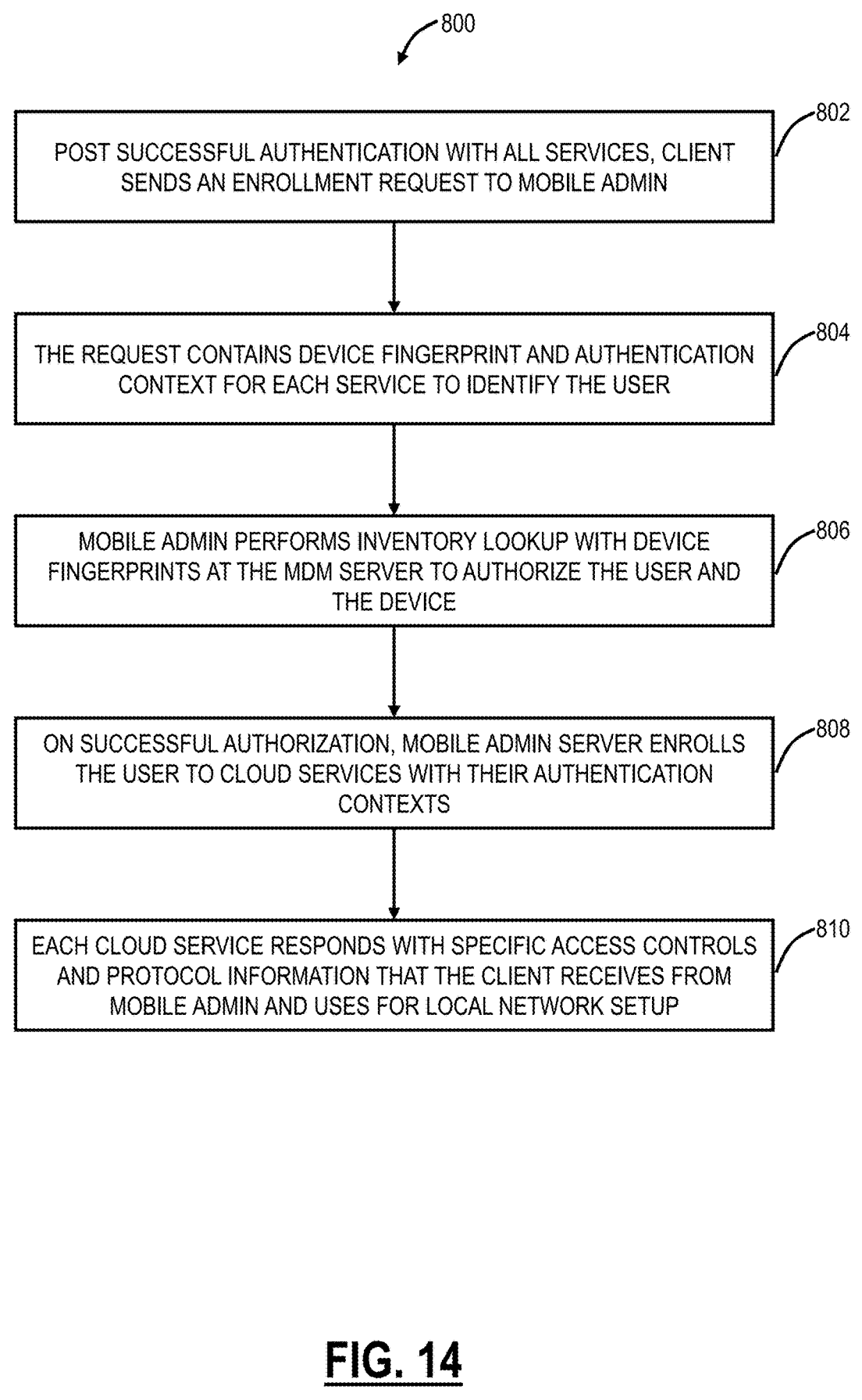

POST SUCCESSFUL AUTHENTICATION WITH ALL SERVICES, CLIENT SENDS AN ENROLLMENT REQUEST TO MOBILE ADMIN

804

THE REQUEST CONTAINS DEVICE FINGERPRINT AND AUTHENTICATION CONTEXT FOR EACH SERVICE TO IDENTIFY THE USER

806

MOBILE ADMIN PERFORMS INVENTORY LOOKUP WITH DEVICE FINGERPRINTS AT THE MDM SERVER TO AUTHORIZE THE USER AND THE DEVICE

808

ON SUCCESSFUL AUTHORIZATION, MOBILE ADMIN SERVER ENROLLS THE USER TO CLOUD SERVICES WITH THEIR AUTHENTICATION CONTEXTS

810

EACH CLOUD SERVICE RESPONDS WITH SPECIFIC ACCESS CONTROLS AND PROTOCOL INFORMATION THAT THE CLIENT RECEIVES FROM MOBILE ADMIN AND USES FOR LOCAL NETWORK SETUP

Figure 15:
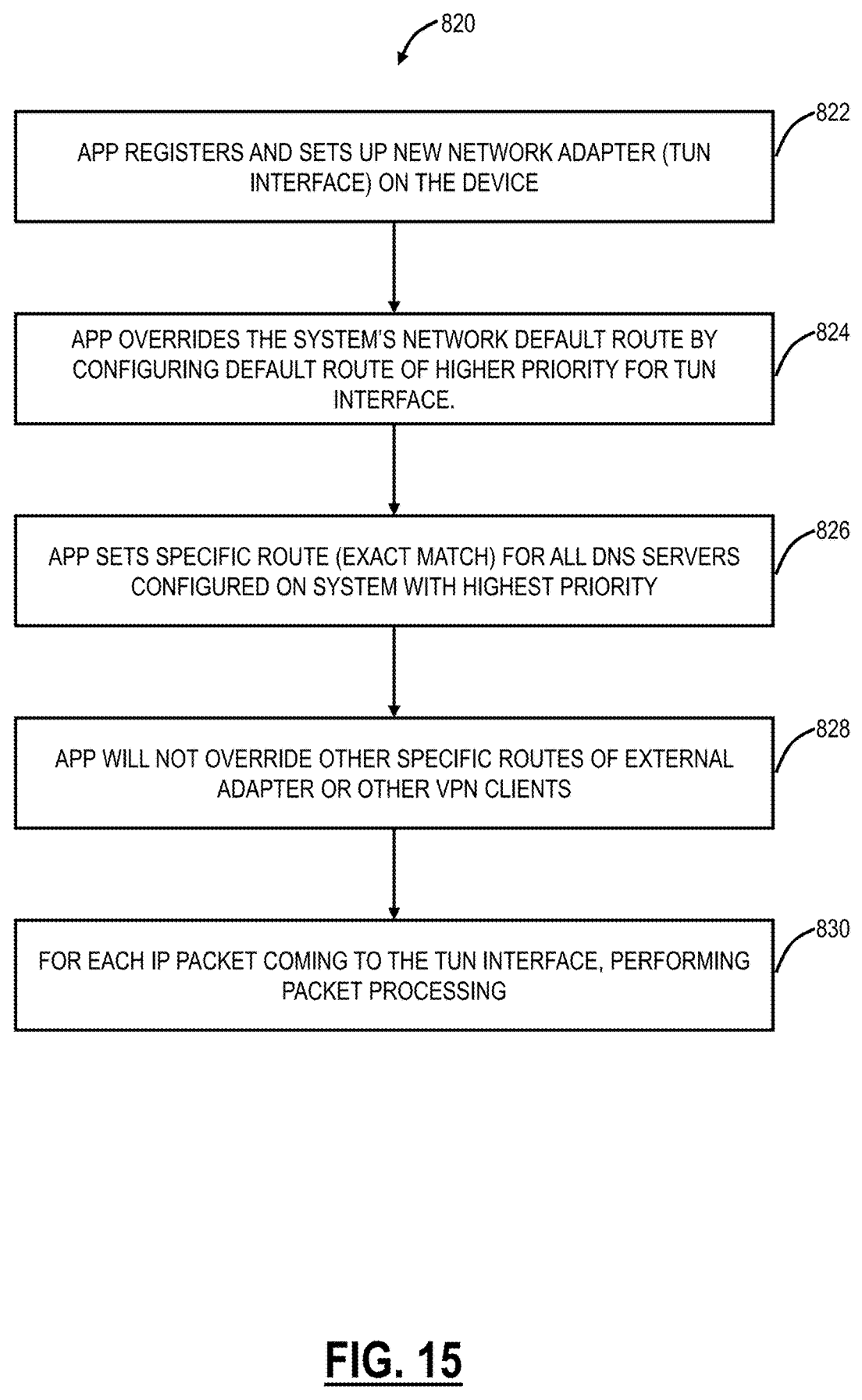

822
APP REGISTERS AND SETS UP NEW NETWORK ADAPTER (TUN INTERFACE) ON THE DEVICE

824
APP OVERRIDES THE SYSTEM'S NETWORK DEFAULT ROUTE BY CONFIGURING DEFAULT ROUTE OF HIGHER PRIORITY FOR TUN INTERFACE.

826
APP SETS SPECIFIC ROUTE (EXACT MATCH) FOR ALL DNS SERVERS CONFIGURED ON SYSTEM WITH HIGHEST PRIORITY

828
APP WILL NOT OVERRIDE OTHER SPECIFIC ROUTES OF EXTERNAL ADAPTER OR OTHER VPN CLIENTS

830
FOR EACH IP PACKET COMING TO THE TUN INTERFACE, PERFORMING PACKET PROCESSING

Figure 18:
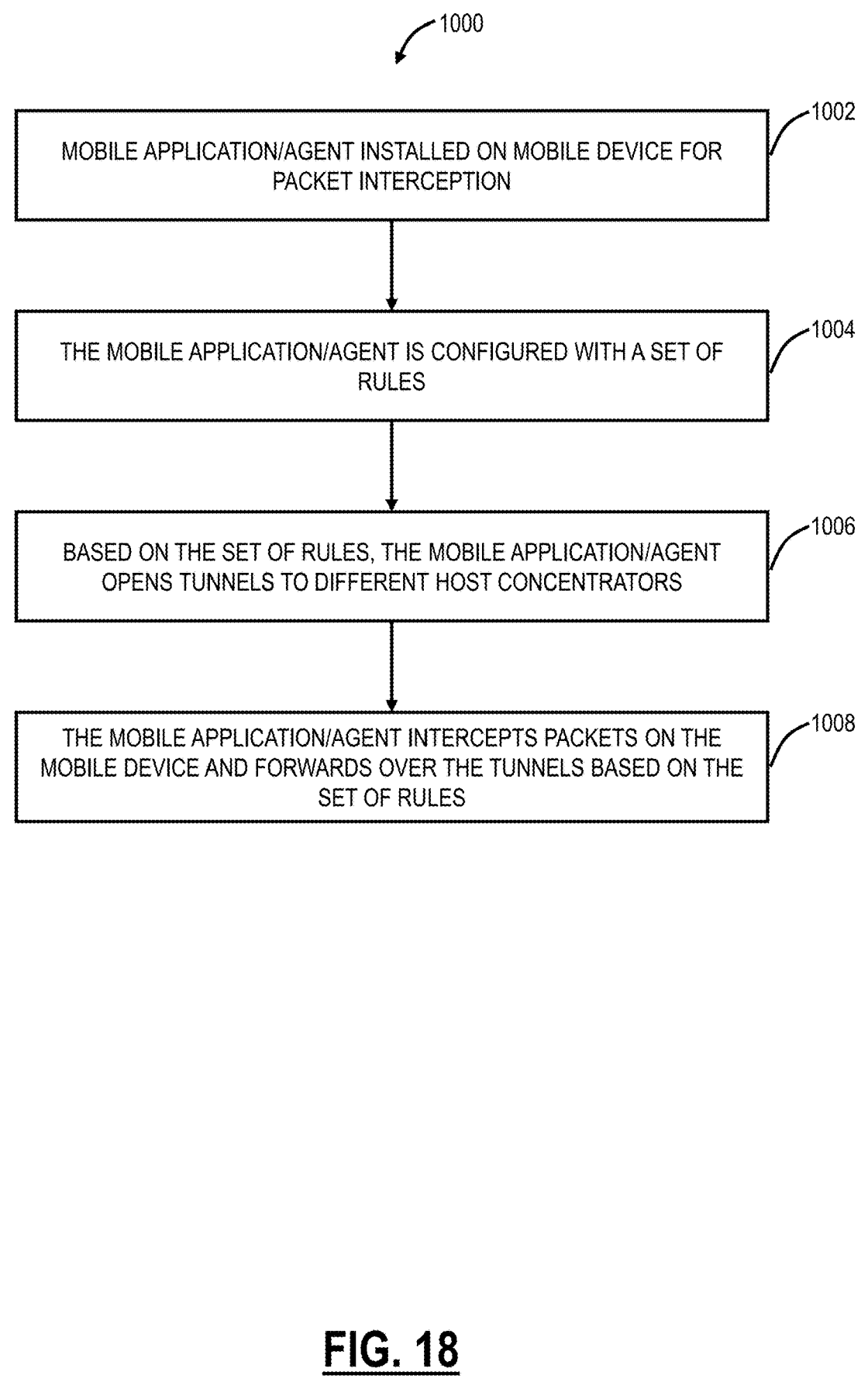

| MOBILE APPLICATION/AGENT INSTALLED ON MOBILE DEVICE FOR PACKET INTERCEPTION | 1002 |

↓

| THE MOBILE APPLICATION/AGENT IS CONFIGURED WITH A SET OF RULES | 1004 |

↓

| BASED ON THE SET OF RULES, THE MOBILE APPLICATION/AGENT OPENS TUNNELS TO DIFFERENT HOST CONCENTRATORS | 1006 |

↓

| THE MOBILE APPLICATION/AGENT INTERCEPTS PACKETS ON THE MOBILE DEVICE AND FORWARDS OVER THE TUNNELS BASED ON THE SET OF RULES | 1008 |

Figure 19:
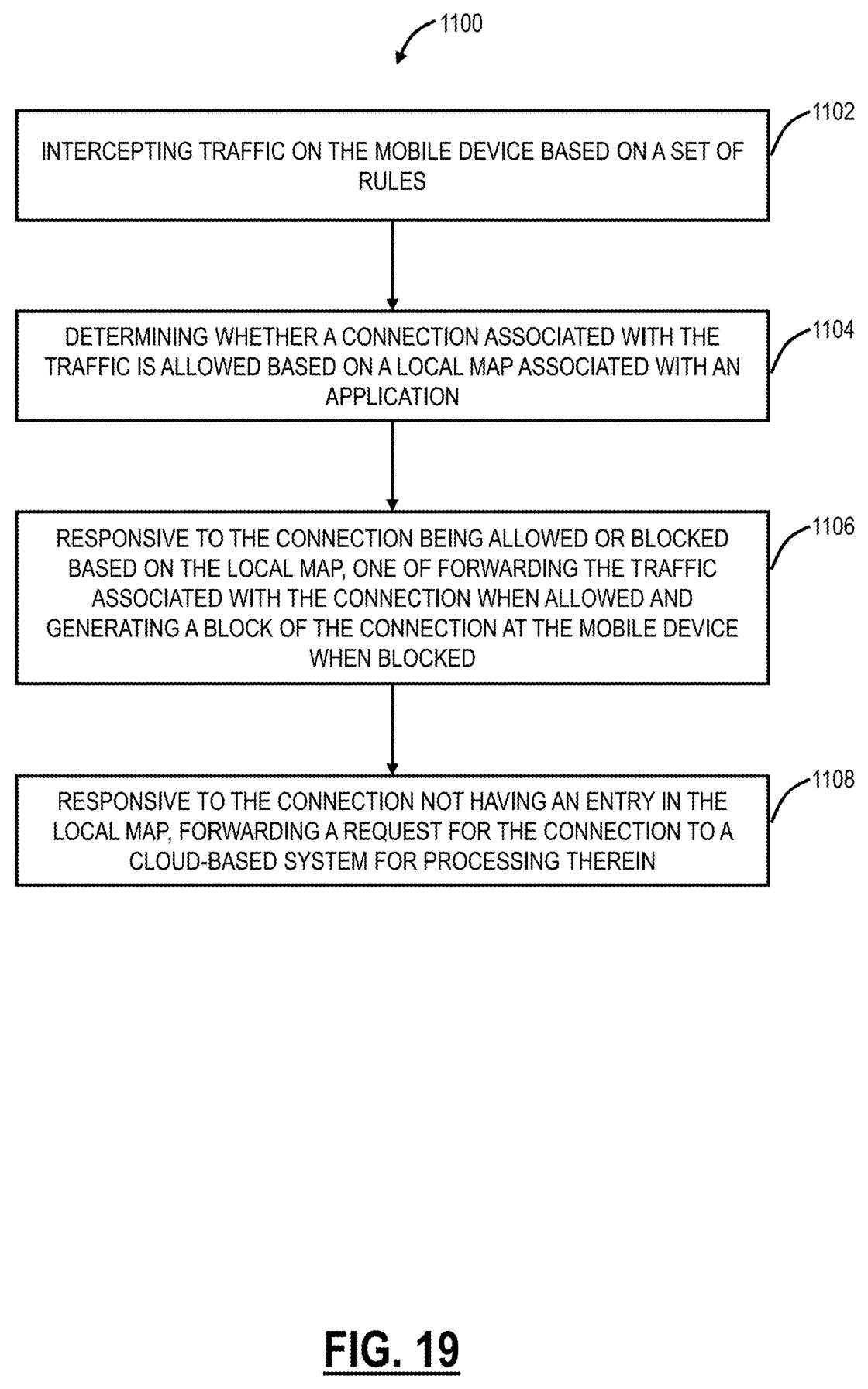

┌─────────────────────────────────────────────────────────┐
│ INTERCEPTING TRAFFIC ON THE MOBILE DEVICE BASED ON A SET OF │ ⟋1102
│ RULES                                                       │
└─────────────────────────────────────────────────────────┘

┌─────────────────────────────────────────────────────────┐
│ DETERMINING WHETHER A CONNECTION ASSOCIATED WITH THE       │ ⟋1104
│ TRAFFIC IS ALLOWED BASED ON A LOCAL MAP ASSOCIATED WITH AN │
│ APPLICATION                                                 │
└─────────────────────────────────────────────────────────┘

┌─────────────────────────────────────────────────────────┐
│ RESPONSIVE TO THE CONNECTION BEING ALLOWED OR BLOCKED      │ ⟋1106
│ BASED ON THE LOCAL MAP, ONE OF FORWARDING THE TRAFFIC       │
│ ASSOCIATED WITH THE CONNECTION WHEN ALLOWED AND             │
│ GENERATING A BLOCK OF THE CONNECTION AT THE MOBILE DEVICE   │
│ WHEN BLOCKED                                                │
└─────────────────────────────────────────────────────────┘

┌─────────────────────────────────────────────────────────┐
│ RESPONSIVE TO THE CONNECTION NOT HAVING AN ENTRY IN THE    │ ⟋1108
│ LOCAL MAP, FORWARDING A REQUEST FOR THE CONNECTION TO A     │
│ CLOUD-BASED SYSTEM FOR PROCESSING THEREIN                   │
└─────────────────────────────────────────────────────────┘

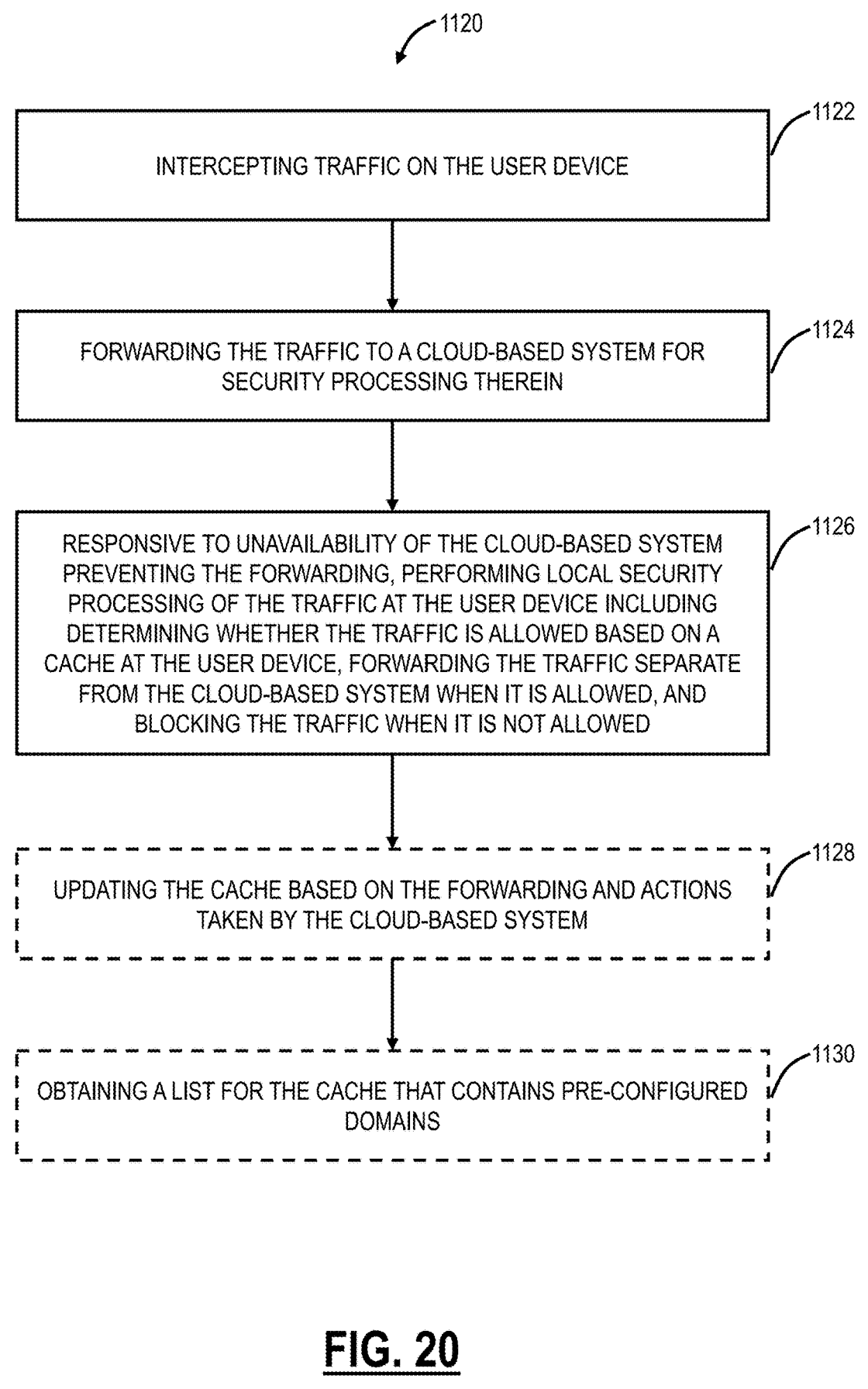

INTERCEPTING TRAFFIC ON THE USER DEVICE

1124

FORWARDING THE TRAFFIC TO A CLOUD-BASED SYSTEM FOR SECURITY PROCESSING THEREIN

1126

RESPONSIVE TO UNAVAILABILITY OF THE CLOUD-BASED SYSTEM PREVENTING THE FORWARDING, PERFORMING LOCAL SECURITY PROCESSING OF THE TRAFFIC AT THE USER DEVICE INCLUDING DETERMINING WHETHER THE TRAFFIC IS ALLOWED BASED ON A CACHE AT THE USER DEVICE, FORWARDING THE TRAFFIC SEPARATE FROM THE CLOUD-BASED SYSTEM WHEN IT IS ALLOWED, AND BLOCKING THE TRAFFIC WHEN IT IS NOT ALLOWED

1128

UPDATING THE CACHE BASED ON THE FORWARDING AND ACTIONS TAKEN BY THE CLOUD-BASED SYSTEM

1130

OBTAINING A LIST FOR THE CACHE THAT CONTAINS PRE-CONFIGURED DOMAINS

FIG. 20

Figure 21:
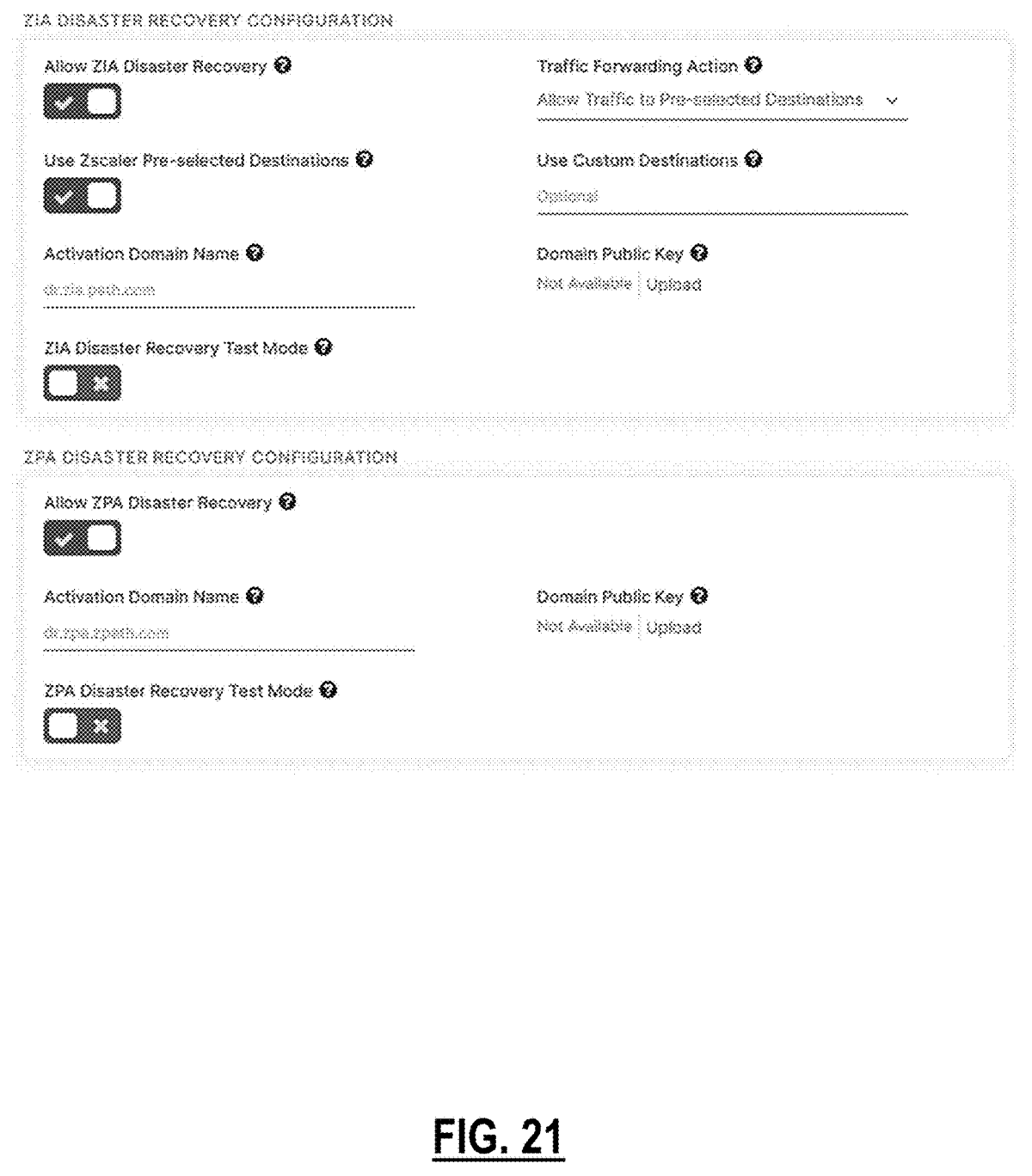

ZIA DISASTER RECOVERY CONFIGURATION

Allow ZIA Disaster Recovery ❷

Traffic Forwarding Action ❷

Allow Traffic to Pre-selected Destinations   ⌄

Use Zscaler Pre-selected Destinations ❷

Use Custom Destinations ❷

Optional

Activation Domain Name ❷ dr.zia.path.com

Domain Public Key ❷

Not Available | Upload

ZIA Disaster Recovery Test Mode ❷

ZPA DISASTER RECOVERY CONFIGURATION

Allow ZPA Disaster Recovery ❷

Activation Domain Name ❷ dr.zpa.zpath.com

Domain Public Key ❷

Not Available | Upload

ZPA Disaster Recovery Test Mode ❷

2402
Receiving one or more disaster recovery configurations

2404
Identifying activation of a disaster recovery mode

2406
Controlling traffic flow such that the traffic is any of blocked to all destinations, allowed to all destinations, and allowed to preselected destinations based on the one or more received disaster recovery configurations

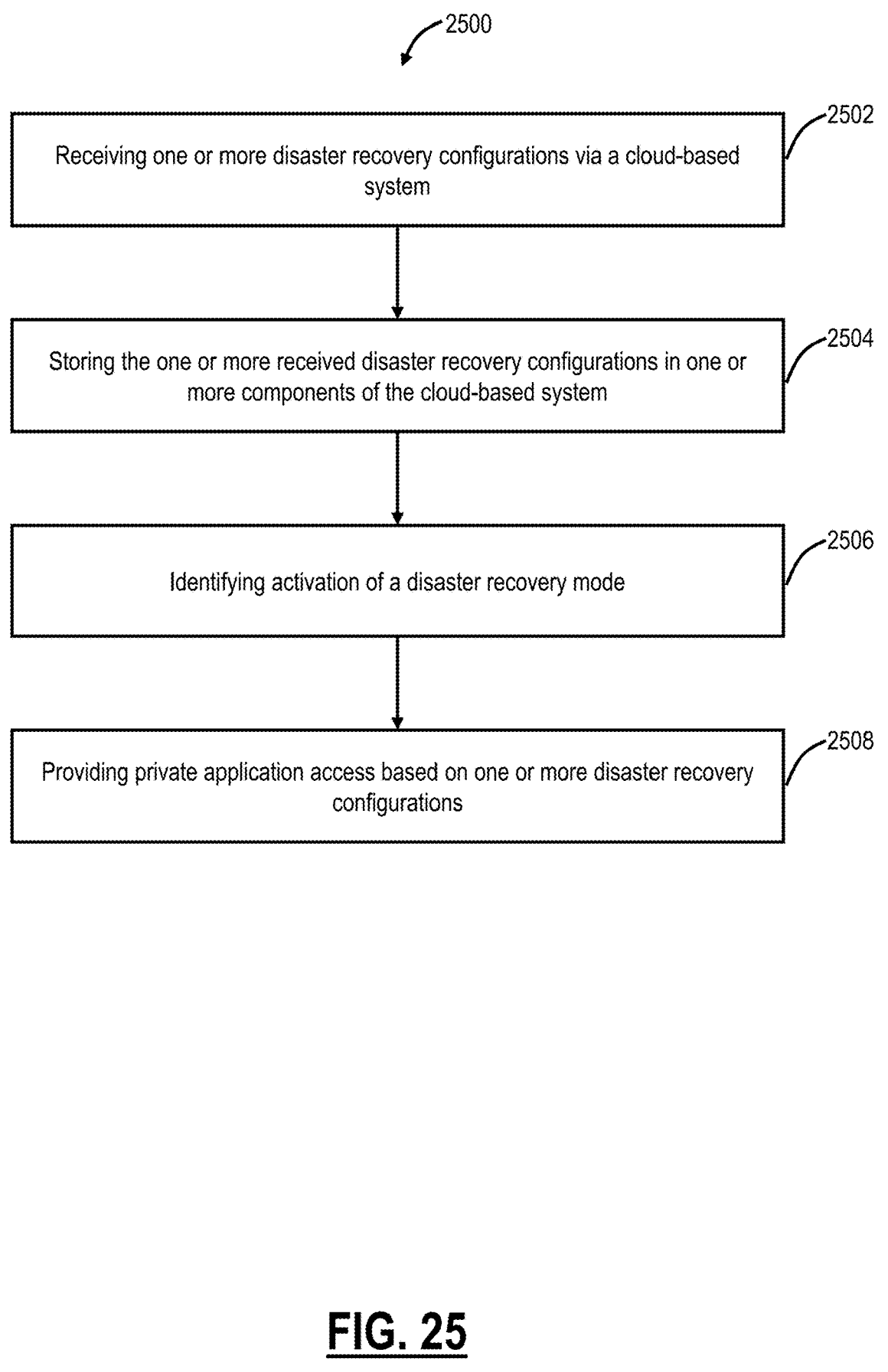

2500

2502
Receiving one or more disaster recovery configurations via a cloud-based system 2504
Storing the one or more received disaster recovery configurations in one or more components of the cloud-based system 2506
Identifying activation of a disaster recovery mode 2508
Providing private application access based on one or more disaster recovery configurations

FIG. 25

DISASTER RECOVERY FOR CLOUD-BASED MONITORING OF INTERNET ACCESS

CROSS-REFERENCE TO RELATED APPLICATION(S)

The present patent application/patent is a continuation-in-part of U.S. patent application Ser. No. 17/154,139, filed Jan. 21, 2021, and entitled "Disaster recovery for a cloud-based security service," which is a continuation-in-part of U.S. patent application Ser. No. 16/922,353, filed Jul. 7, 2020, and entitled "Enforcing security policies on mobile devices in a hybrid architecture," the contents of each are incorporated by reference herein in their entirety.

FIELD OF THE DISCLOSURE

The present disclosure generally relates to computer networking systems and methods. More particularly, the present disclosure relates to systems and methods for disaster recovery for cloud-based monitoring of internet access.

BACKGROUND OF THE DISCLOSURE

Corporate applications (also referred to as enterprise applications, private applications, cloud applications, etc.) are going mobile, as are the vast majority of users (i.e., employees, partners, contractors, etc. of an enterprise). The traditional view of an enterprise network (i.e., corporate, private, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter. This results in an increased risk for the enterprise data residing on unsecured and unmanaged devices as well as the security risks in access to the Internet.

Further, having all traffic through the well-defined perimeter simply does not scale. On the user device side, several client-side agents provide security and compliance, but there are inherent challenges with these agents like battery drainage issues, limited signature based-detection ability, high processor consumption, etc. As such, security on mobile devices is not as practical as on desktop, laptops, etc. Accordingly, cloud-based security solutions have emerged, such as Zscaler Internet Access (ZIA) and Zscaler Private Access (ZPA), available from Zscaler, Inc., the applicant, and assignee of the present application. With mobile devices and a cloud-based security system, there is an opportunity to leverage the benefits of client-side protection with cloud-based protection with the goals of reducing bandwidth, reducing latency, having an access solution when there are reachability or connectivity issues, etc.

Also, such cloud-based security services provide significant advantages in scalability, simplicity, efficiency, etc. With this approach, security processing is in the cloud, off the device. Of course, cloud-based security services are designed for high availability, redundancy, geographic distribution, etc. However, there can always be situations where a device has network access but there is not connectivity to the cloud. That is, there can be a "disaster" where the cloud is unavailable to provide security processing for any reason, e.g., network congestion, server overload, failures in the cloud, etc. In such situations, user access would not have the security processing.

BRIEF SUMMARY OF THE DISCLOSURE

In various embodiments, the present disclosure includes a method implementing steps, a cloud-based system configured to implement the steps, and the steps as computer-executable instructions stored in a non-transitory computer-readable medium. The steps include receiving one or more disaster recovery configurations; identifying activation of a disaster recovery mode; and controlling traffic flow such that the traffic is any of blocked to all destinations, allowed to all destinations, and allowed to preselected destinations based on the one or more received disaster recovery configurations.

The steps can further include updating a cache based on the actions taken during activation of the disaster recovery mode. The one or more disaster recovery configurations can each be associated with one or more specific tenants of a cloud-based system. The one or more disaster recovery configurations include a list of global default destinations preselected by a cloud provider. The one or more disaster recovery configurations additionally include one or more customer defined destination lists. The one or more customer defined destination lists take priority over the list of global default destinations. The list of global default destinations and the customer defined destination lists include domains which are instructed to be one of blocked or allowed.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like;

FIG. 4 is a block diagram of a user device that may be used with the cloud-based system of FIGS. 1 and 2 or the like;

FIG. 12 is a flowchart of a proxy authentication process to the cloud-based system;

FIG. 13 is a flowchart of a VPN authentication process to the cloud-based system;

FIG. 14 is a flowchart of a device enrollment process for the client user device and the unified agent application;

FIG. 15 is a flowchart of a traffic interception process implemented through the unified agent application;

FIG. 18 is a flowchart of a service drive split tunneling process;

FIG. 19 is a flowchart of a process for security processing in a hybrid architecture;

FIG. 20 is a flowchart of a process for disaster recovery via the hybrid architecture of FIG. 19;

FIG. 21 is an embodiment of a disaster recovery configuration page;

FIG. 25 is a flow chart of a process for disaster recovery for cloud-based private application access.

DETAILED DESCRIPTION OF THE DISCLOSURE

Figure 1:
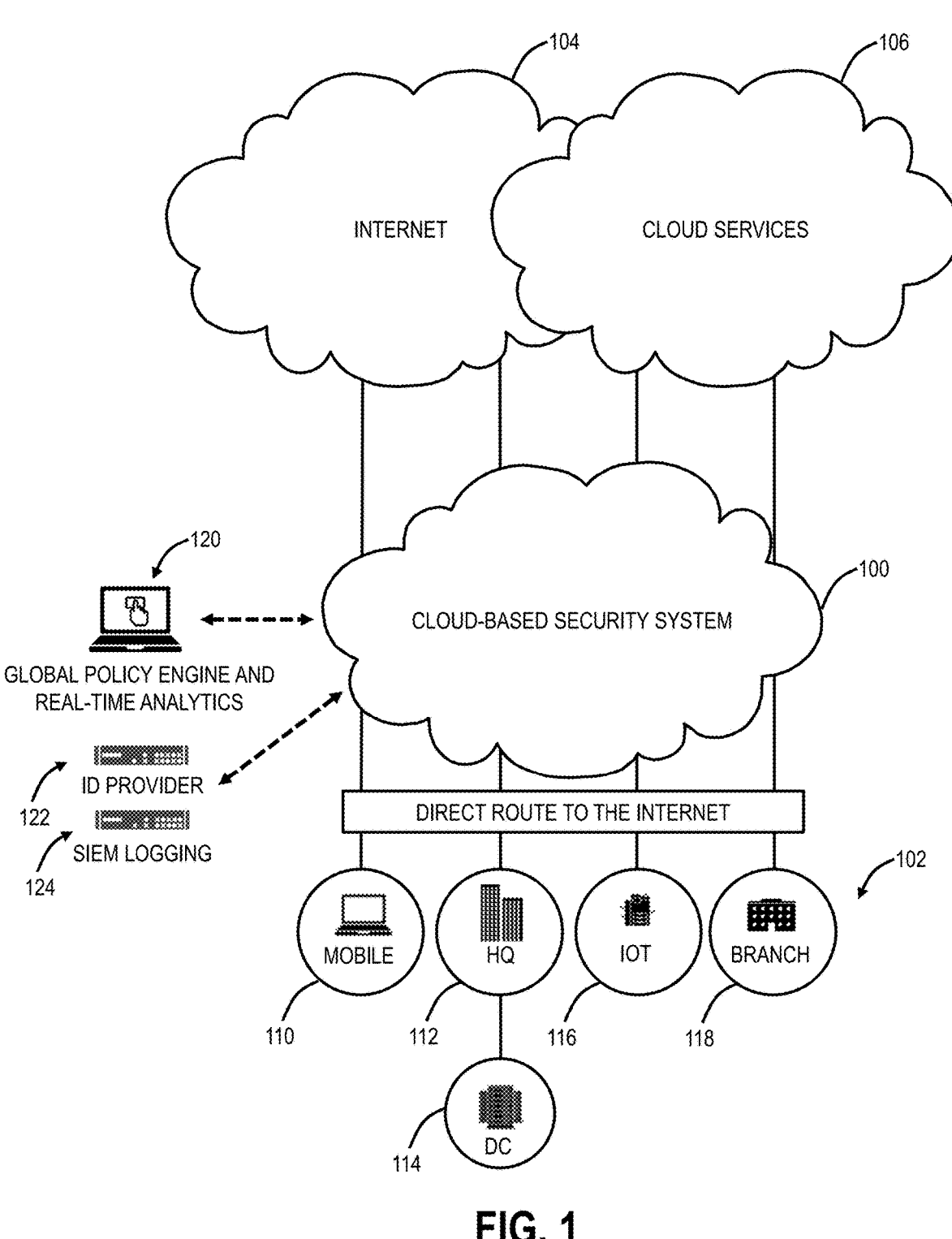
FIG. 1 is a network diagram of a cloud-based system offering security as a service.

The present disclosure relates to systems and methods for disaster recovery for cloud-based monitoring of internet access and disaster recovery for cloud-based private application access. Various embodiments include the creation of various configuration files which control how components of a cloud-based system react to a disaster recovery situation. The systems and methods can control which destinations users can reach during activation of a disaster recovery mode.

Additionally, the present disclosure relates to systems and methods for disaster recovery for a cloud-based security service. In particular, the disaster recovery can include a hybrid architecture. In particular, the hybrid architecture is one where there is some client-side processing of security functions and some cloud-based processing, in conjunction with one another. The objective is to leverage the benefits of both approaches while reducing or eliminating the shortcomings. The present disclosure includes a lightweight agent or application ("client connector") that is executed on mobile devices with the agent supporting application firewall, Uniform Resource Locator (URL) filtering, Data Loss Prevention (DLP), etc. Further, the lightweight agent or application is synchronized with a cloud-based security system for updates, processing in the cloud, etc. This approach with a hybrid architecture enforces security policies on a mobile device while leveraging the cloud in an efficient and optimized manner. For disaster recovery, the lightweight agent or application can be used to cache user activity for local policy, such as based on user browsing, and use the cached local policy in a failure scenario. Thus, there can be security processing without the cloud-based system and without failing open (with no security processing).

Additionally, the present disclosure relates to systems and methods for service driven split tunneling of mobile network traffic. The systems and methods include an app or agent on a user device (e.g., a mobile device) which performs split tunneling based upon port, protocol, and destination IP address instead of just destination IP. This provides granular controls to IT administrators to steer a user's network traffic based upon the demands of the service. This is very advantageous from a scalability point of view as the demands for a particular service grow, that traffic can be individually distributed, load-balanced, and served without impacting traffic of other services. This form of split tunneling also allows for efficient usage of resources both on the end user's device as well as backend concentrators. For instance, if all traffic, including HTTP and HTTPS, is tunneled via an SSL VPN, there is an overhead of decrypting SSL traffic twice, one for the transport and the other for the application itself. While splitting traffic based upon the protocol, the HTTPS transport can go unencrypted since the HTTPS traffic itself is encrypted. This saves both the client and the avoiding encryption and decryption twice, saving a significant amount of computational power on all ends.

Another benefit of this form of split tunneling is that it takes into account the quality of service requirements for different protocols. For example, in a conventional VPN, all VOIP and UDP traffic will be tunneled over an SSL VPN with all other TCP traffic as well. Since all these protocols have different service requirements, the traditional VPN generally underperforms and is difficult to scale. With this service driven split tunneling, VOIP over UDP traffic can be tunneled separately to a specific UDP traffic concentrator that is designed for handling large volumes of such traffic. In this case, VOIP traffic does not need to fight with other protocols through its intended destination. In another use case, an admin may altogether decide not to tunnel VOIP traffic and go directly from the user's device. Note that this kind of granularity is not possible with split tunneling based upon destination IP address alone. The service driven split tunneling further allows for on-demand embarking (or disembarking) of particular network traffic, i.e., whenever the IT infrastructure is ready to support a new protocol, the agent can start (or stop) tunneling that traffic based upon configured rules.

Further, the present disclosure relates to systems and methods for cloud-based unified service discovery and secure availability. The systems and methods enable a user to connect to multiple cloud services through the dynamic discovery of available services, followed by authentication and access as exposed in the corresponding service protocol. The systems and methods address the unmanageable growth of mobility and cloud-based services, which have led to a proliferation of individual applications for access to individual services. The systems and method can be implemented through a mobile application ("app") which overcomes the hassle of deploying and managing several applications across a gamut of mobile devices, operating systems, and mobile networks to gain secure access to the cloud-based Internet or intranet resources. The mobile application can uniquely perform a Dynamic evaluation of Network and Service Discovery, Unified Enrollment to all services, application-dependent service enablement, Service protocol learning, Service Availability through secure network traffic forwarding tunnels, and the like.

Again, enterprises have a strong need to provide secure access to cloud services to its end users. The growth of mobility and cloud in the IT enterprise has made it impossible for IT admins to deploy individual applications for individual services. The mobile app associated with the systems and methods overcomes these limitations through the dynamic discovery of available services to the end user, followed by authentication and access to individual services. Further, the mobile app insightfully learns the protocol for each service and establishes a secure tunnel to the service. In essence, the mobile app is one app that an enterprise may use to provide secure connectivity to the Internet and diversified internal corporate applications. At the time of user enrollment, the mobile app will discover all services provided by the enterprise cloud and will enroll the user in all of those services. It will then set up secure tunnels for each service depending upon the port, protocol, and intended destination of requested traffic.

The mobile app will also discover all applications provided within the enterprise cloud along with a Global VPN (GVPN) service and show the available services to end users. Endpoint Applications today provide one service for a specific network function (such as a VPN to a corporate network, web security, antivirus to access the Internet). The mobile app can be used to enable all these services with single enrollment. The mobile app will provide services to darknet applications along with securing the Internet traffic. The mobile app can set up a local network on the mobile device.

Example Cloud-Based System Architecture

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 3:
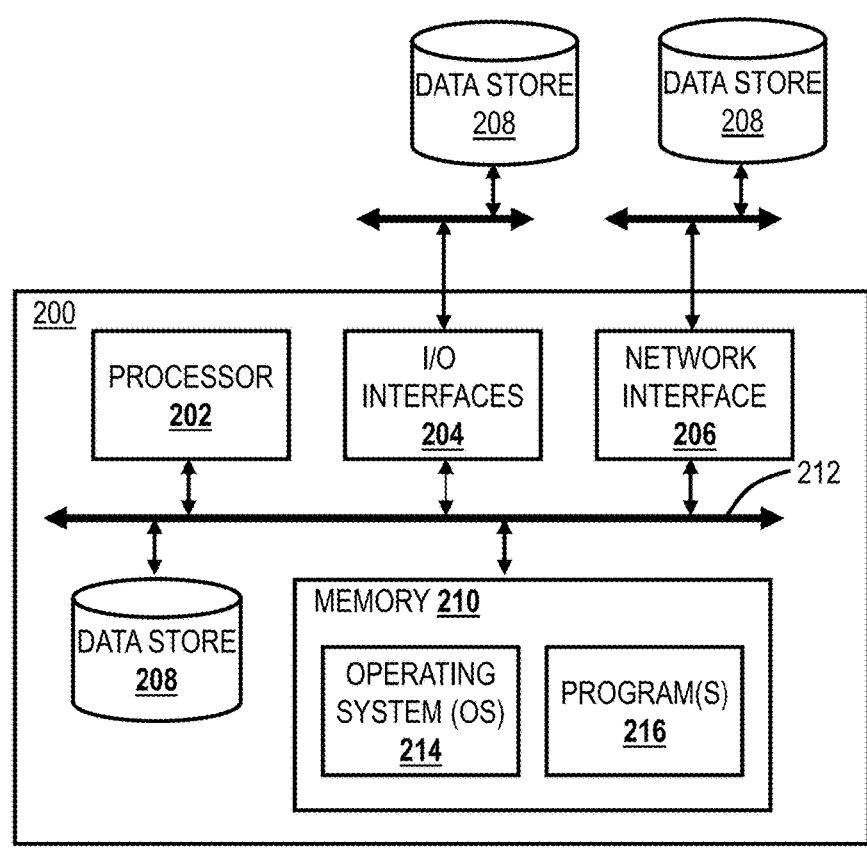

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
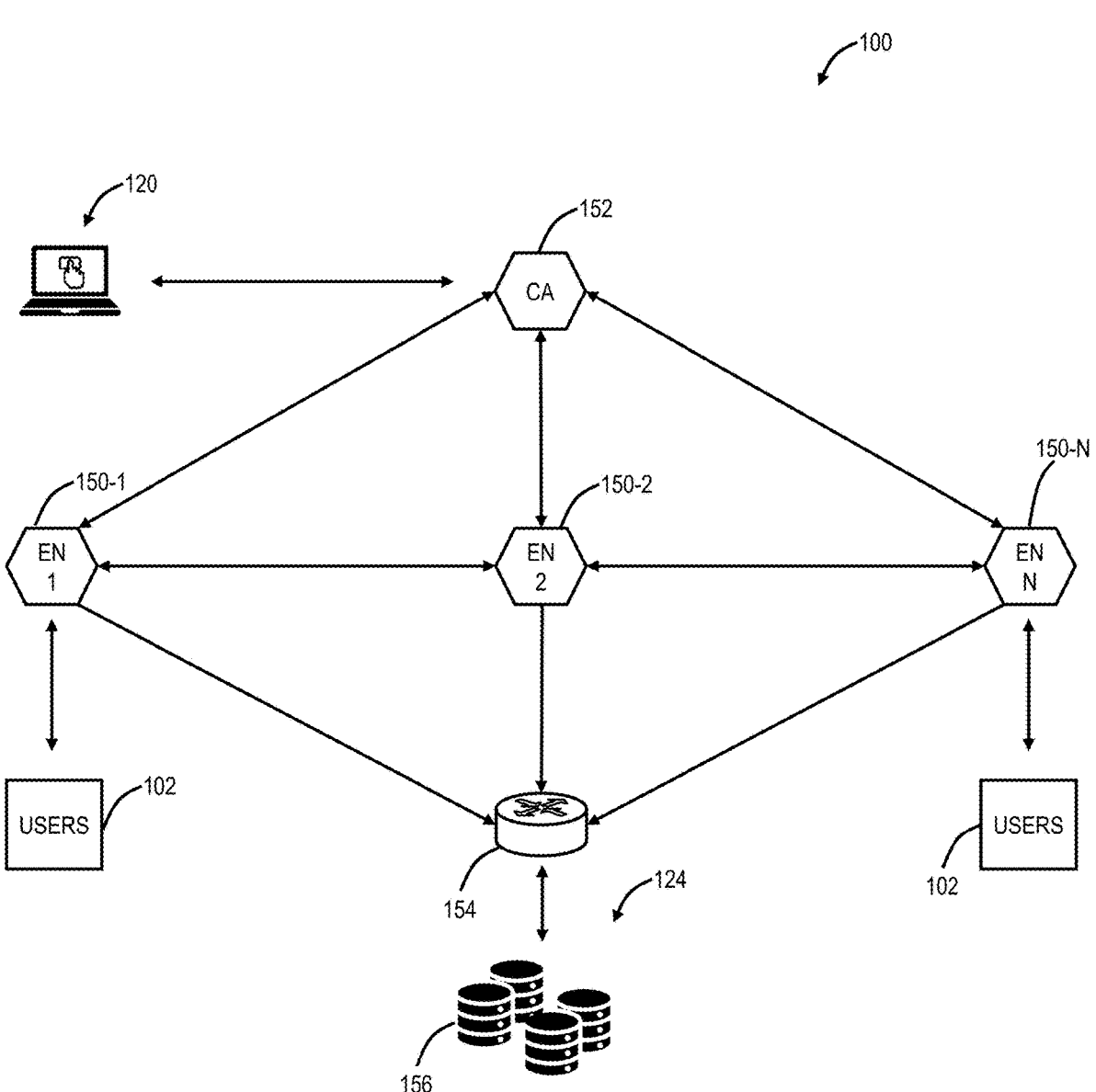
FIG. 2 is a network diagram of an example implementation of the cloud-based system.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA152). The nodes 150, 152, while described as nodes, can include one or more servers, including physical servers, virtual machines (VM) executed on physical hardware, etc. An example of a server is illustrated in FIG. 2. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is process through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, micro-service segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chip-set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 4:
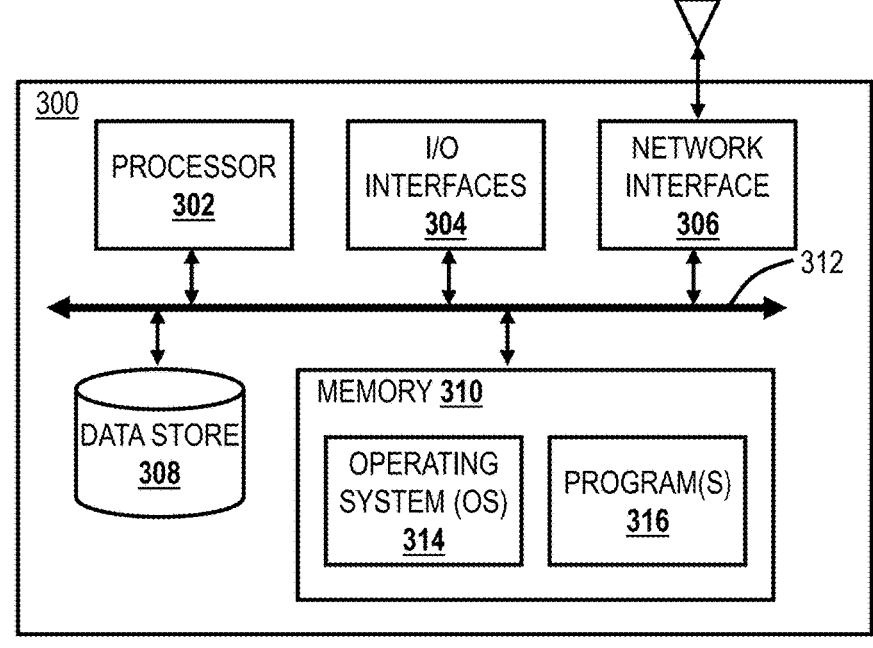

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The present disclosure relates to mobile devices, which are one subset of the user device 300. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

User Device Application for Traffic Forwarding and Monitoring

Figure 5:
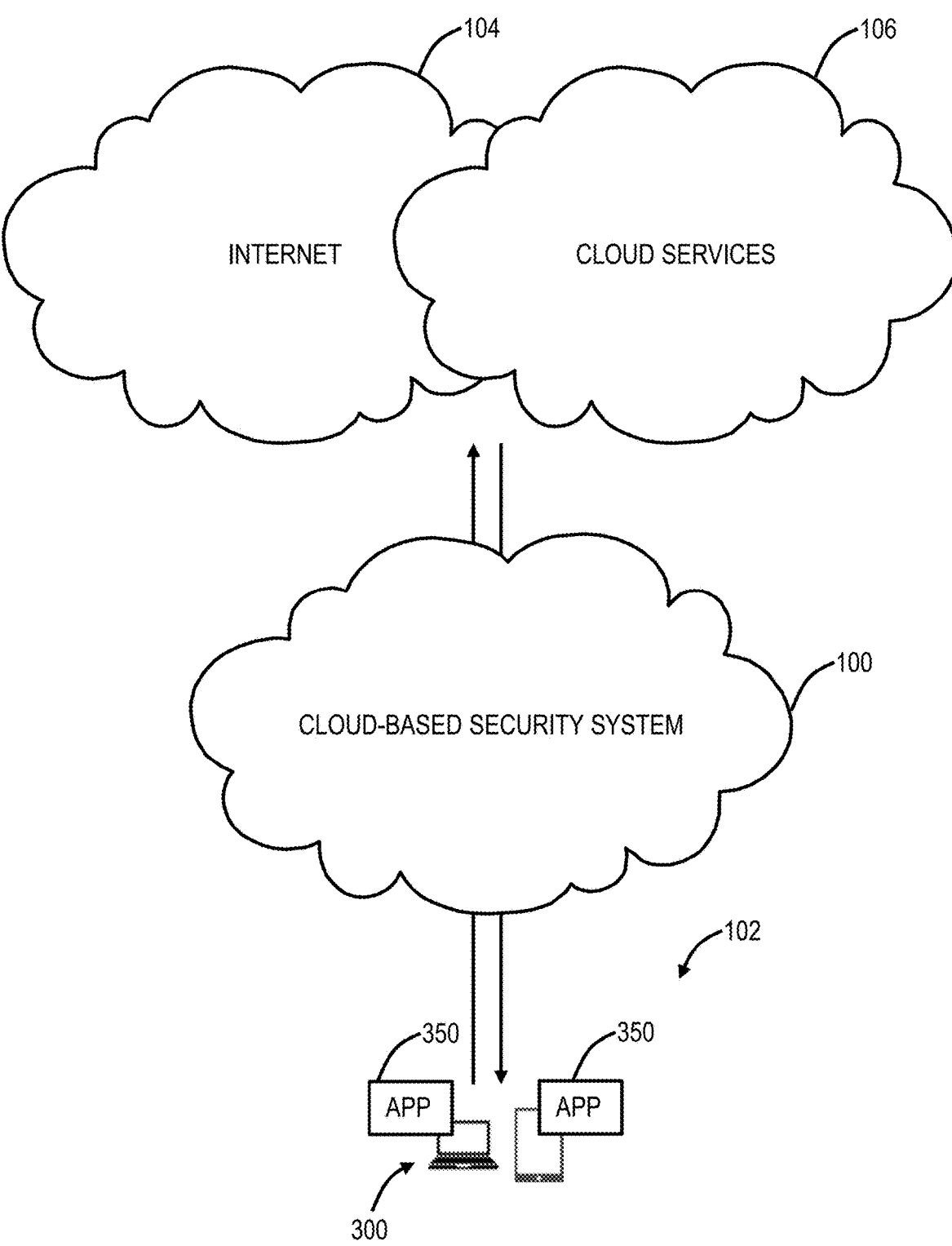
FIG. 5 is a network diagram of the cloud-based system illustrating an application on user devices with users configured to operate through the cloud-based system.

FIG. 5 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps. For example, the application 350 can be referred to as a "client connector," enabling the user device 300 to connect to cloud services.

The application 350 is configured to auto-route traffic for a seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or end user 102 setup.

Zero Trust Network Access Using the Cloud-Based System

Figures 6, 7:
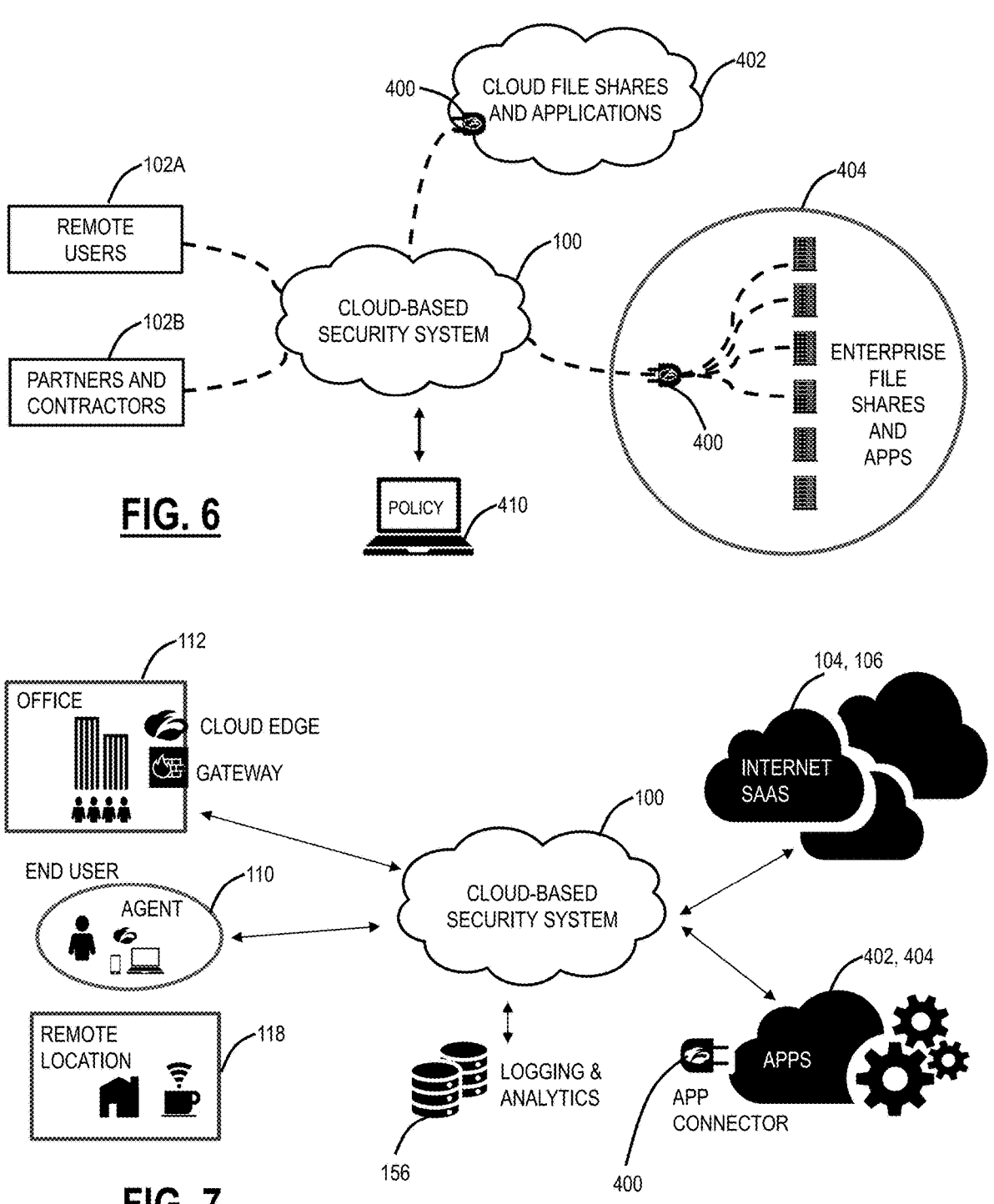
FIG. 6 is a network diagram of a Zero Trust Network Access (ZTNA) application utilizing the cloud-based system of FIGS. 1 and 2.
FIG. 7 is a network diagram of the cloud-based system of FIGS. 1 and 2 in an application of digital experience monitoring.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 404, connected to enterprise file shares and applications. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300. The connector 400 can be referred to as a "service edge."

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402 from the network 404, instead of providing access with a connector 400, in front of the applications 402, an application on the user device 300, a central authority 152 to push policy 410, and the cloud-based system 100 to stitch the applications 402 and the software connectors 400 together, on a per-user, per-application basis.

With the virtual private access, users can only see the specific applications 402 allowed by the policy 410. Everything else is "invisible" or "dark" to them. Because the virtual private access separates the application from the network, the physical location of the application 402 becomes irrelevant—if applications 402 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy, because the virtual private access is a service offering to end-users and enterprises. FIG. 5 can include the ZPA service from Zscaler, Inc.

Digital Experience Monitoring

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

Unified Agent Application

Figure 8:
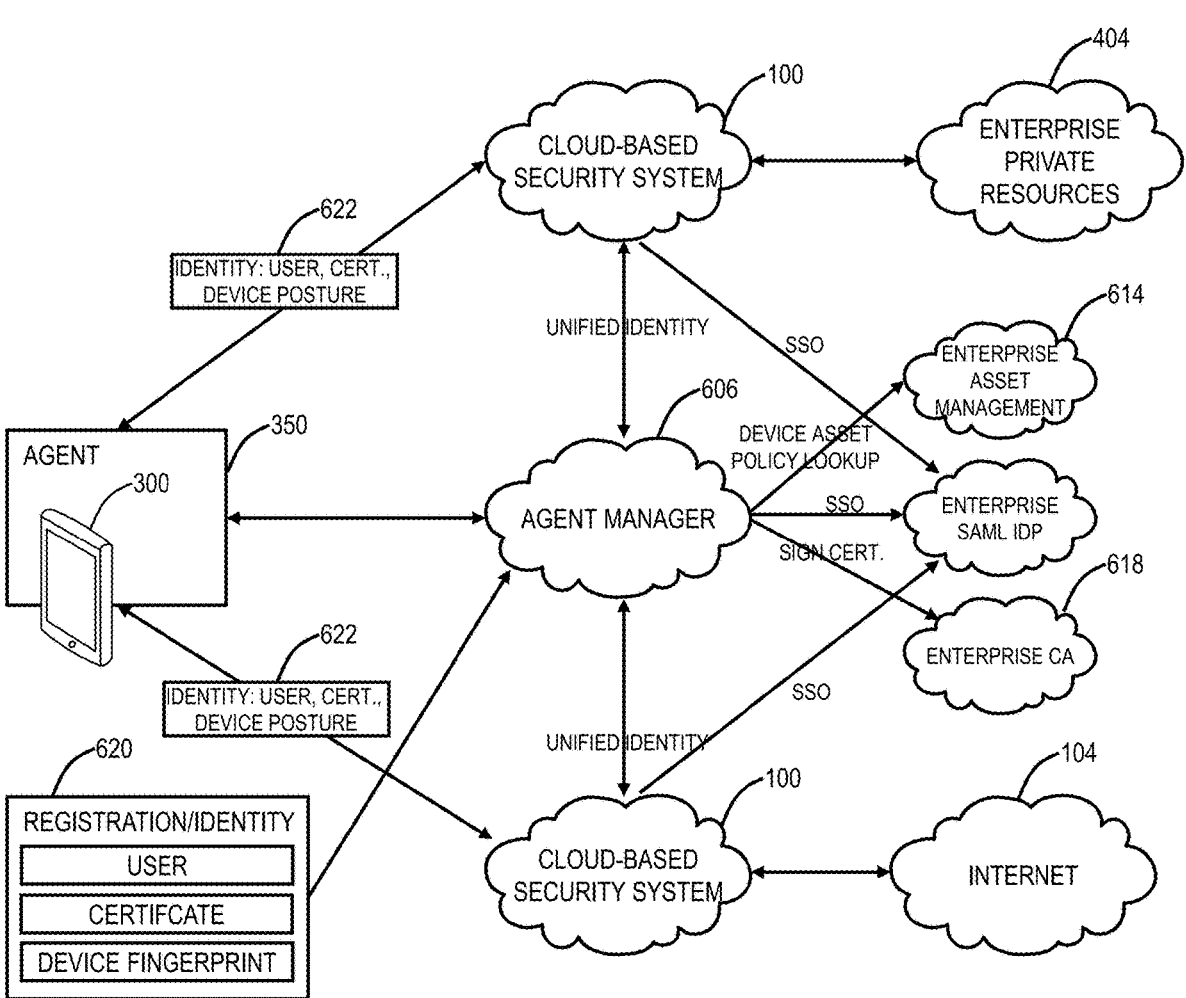
FIG. 8 is a network diagram of a unified agent application and associated connectivity and functionality with the cloud-based system.

FIG. 8 is a network diagram of the use of the application 350 as a unified agent application and associated connectivity and functionality with the cloud-based system 100, i.e., a "client connector." Again, the unified agent application 350 is executed on a user device 300. The unified agent application 350 dynamically learns all available services, adapts to changing network environments, and provides a seamless and secure network resource access to Internet and darknet hosted applications. This is achieved through dynamic evaluation of network conditions, enrollment to individual services, learning individual service protocols, creating a link-local network on the user device 300, and establishing multiple secure tunnels to cloud services over this local network.

The unified agent application 350 is communicatively coupled to an agent manager cloud 606, as well as the cloud-based system 100. The unified agent application 350 enables communication to enterprise private resources on the enterprise network 404 via the cloud-based system 100 and to the Internet 104 via the cloud-based system 100. The agent manager cloud 606 can communicate with enterprise asset management 614, an enterprise Security Assertion Markup Language (SAML) Identity Provider (IDP) 616, and an enterprise Certificate Authority (CA) 618. The user device 300 and the unified agent application 350 can perform a registration/identity 620 process through the agent manager cloud 606 where the user identity, the user's certificates, and a device fingerprint can uniquely identify the user device 300. Once registered, the unified agent application 350 has an identity 622, which can include the user, certificates, device posture, etc. and which is shared with the cloud-based system 100.

The unified agent application 350 operates on a client-server model where an IT admin enables appropriate services for end users at a Cloud Administration Server (CAS), which can be part of the agent manager cloud 606, namely the enterprise asset management 614. Every client can make a unicast request to the agent manager cloud 606 (e.g., CAS) to discover all enabled services. On acknowledging the response, the client issues a request to authenticate to each service's cloud Identity Providers, the enterprise SAML IDP 616. Authentication can be multi-factor depending upon the nature of the service. On successful authentication, server contacts Mobile Device Management (MDM) or Inventory management provider to define access control rights for the user device 300. Post authorization, the user device 300 is successfully enrolled in the agent manager cloud 606, which tracks and monitors all behavior of the user device 300.

Post-enrollment, the user device 300 creates a link local network with a specific IP configuration, opens a virtual network interface to read and write packets to create secure tunnels to available services through the cloud-based system 100. On network changes, the user device 300 dynamically evaluates reachability to pre-configured domains and depending upon the result, it appropriately transitions all network tunnels, thus providing a seamless experience to the end user. Further, the user device 300 also intelligently learns the conditions which are appropriate for setting up network tunnels to cloud services depending upon several network heuristics such as reachability to a particular cloud service.

Unified Agent Application—Functionality

Generally, the unified agent application 350 supports two broad functional categories—1) dynamic service discovery and access controls and 2) service availability. The dynamic service discovery and access controls include service configuration by the administrator, service discovery by the user device 300, service acknowledgment and authentication, service authorization and enrollment, and the like. For service configuration by the administrator, the IT admin can provide cloud service details at a centralized knowledge server, such as part of the agent manager cloud 606, the enterprise asset management 614, etc. The cloud service details include the service type (e.g., Internet/intranet), network protocol, identity provider, server address, port, and access controls, etc.

For service discovery by the user device 300, the user device 300 can issue a network request to a known Cloud Administrative Server (CAS) in the agent manager cloud 606 to discover all enabled services for a user. If a specific cloud server is not known a priori, the user device 300 can broadcast the request to multiple clouds, e.g., through the agent manager cloud 606 communicating to the enterprise asset management 614, the enterprise SAML IDP 616, and the enterprise CA 618.

For the service acknowledgment and authentication, the user device 300 acknowledges the response of service discovery and initiates the authentication flow. The user device 300 learns the authentication protocol through the service discovery configuration and performs authentication of a configured nature at the enterprise SAML IDP 616. For the service authorization and enrollment, post successful authentication, the CAS, authorizes the user device 300, and fetches the access control information by contacting an MDM/Inventory Solutions Provider. Depending upon the user context and the nature of access, the CAS enrolls the user device 300 into several cloud services and informs the cloud services that the user has been enrolled for access.

The service availability includes link local network setup, a traffic interceptor, and dynamic traffic forwarding tunnels to authorized services. The link-local network setup, post-enrollment, has the user device 300 create a local network on the user device 300 itself to manage various networking functionalities. For the traffic interceptor, the user device 300 intercepts and evaluates all Internet traffic. Allowed traffic is tunneled to the cloud services such as in the cloud-based system 100, whereas the rest of the traffic is denied as per enterprise policies. For the dynamic traffic forwarding tunnels to authorized services, depending upon the evaluation, the user device 300 splits the traffic into the different tunnel to individual cloud services such as in the cloud-based system 100.

The unified agent application 350 is a single application that provides secure connectivity to the Internet 104 and darknet hosted applications, such as the enterprise private resources in the enterprise network 404. The unified agent application 350 communicates securely to the agent manager cloud 606, which is controlled by an IT admin. The unified agent application 350 learns available services and authenticates with each service. Post proper enrollment, the unified agent application 350 securely connects to cloud services by means of network tunnels.

Unified Agent Application—Workflow

Figure 9:
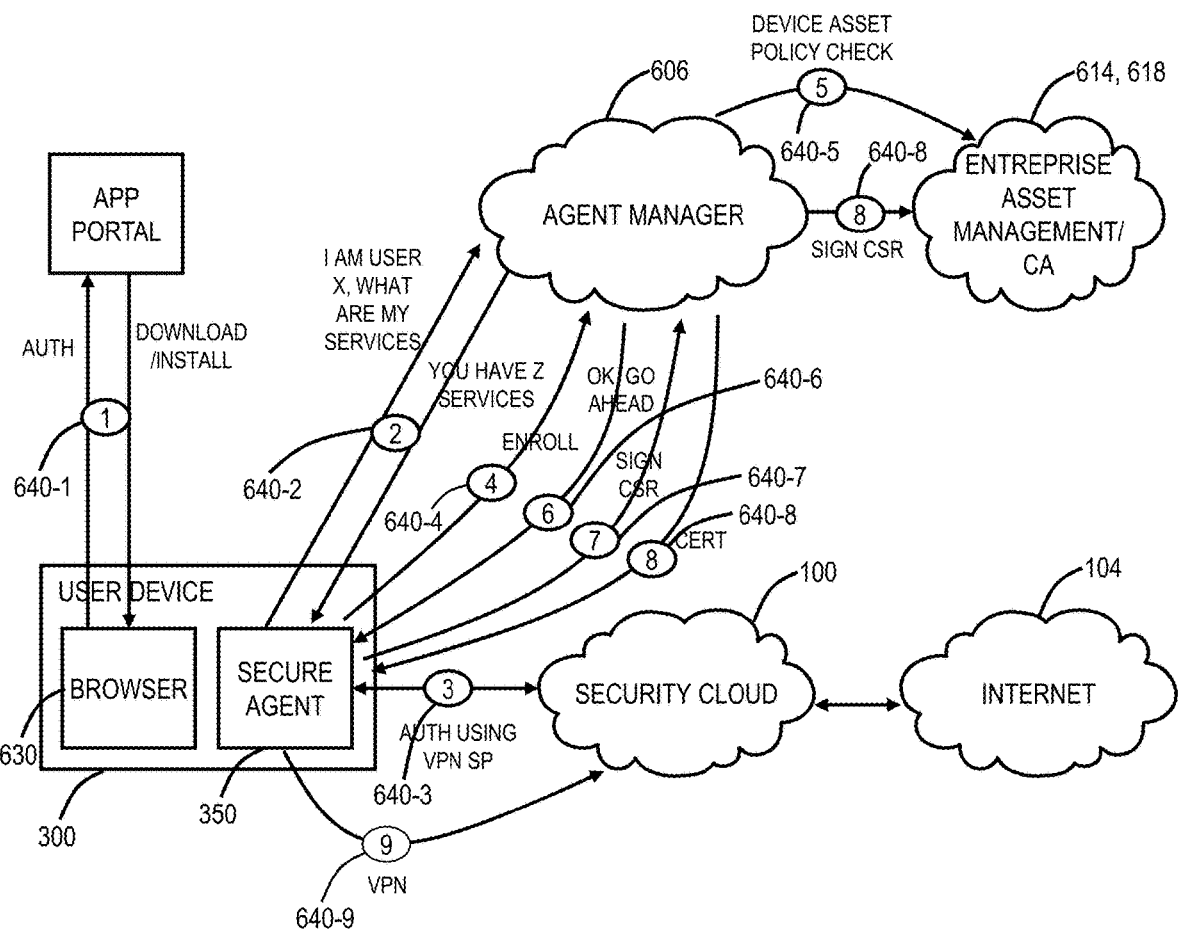
FIG. 9 is a network diagram of example workflow of the unified agent application.

FIG. 9 is a network diagram of the example workflow of the unified agent application 350. The user device 300 again executes the unified agent application 350, as well as a browser 630 (or some other application requesting network services). First, the user device 300 includes authentication through an application portal 632 and download/install of the unified agent application 350 therefrom (step 640-1). Note, the application portal 632 can be a website, Apple's app store, Google Play, Windows Store, etc. Once installed, the unified agent application 350 communicates to the agent manager cloud 606 communicating identity and asking for available services ("I am User X, what are my services?") and the agent manager cloud 606 responds with the available services ("You have Z services") (step 640-2).

Next, the unified agent application 350 includes authentication using a VPN Service Provider (SP) with the cloud-based system 100 (step 640-3). The unified agent application 350 next enrolls the user device 300 through the agent manager cloud 606 (step 640-4). The agent manager cloud 606 performs a device asset policy check with the enterprise asset management 614 (step 640-5). The agent manager cloud 606, upon the successful check, provides the unified agent application 350 an affirmative response (step 640-6). The unified agent application 350 sends a Certificate Signing Request (CSR) to the agent manager cloud 606 (step 640-7), and the agent manager cloud 606 sends the CSR request to the enterprise CA, and the certificate is returned to the unified agent application 350 (step 640-8). Finally, the unified agent application 350 enables VPN connectivity to the cloud-based system 100 (step 640-9).

Figure 10:
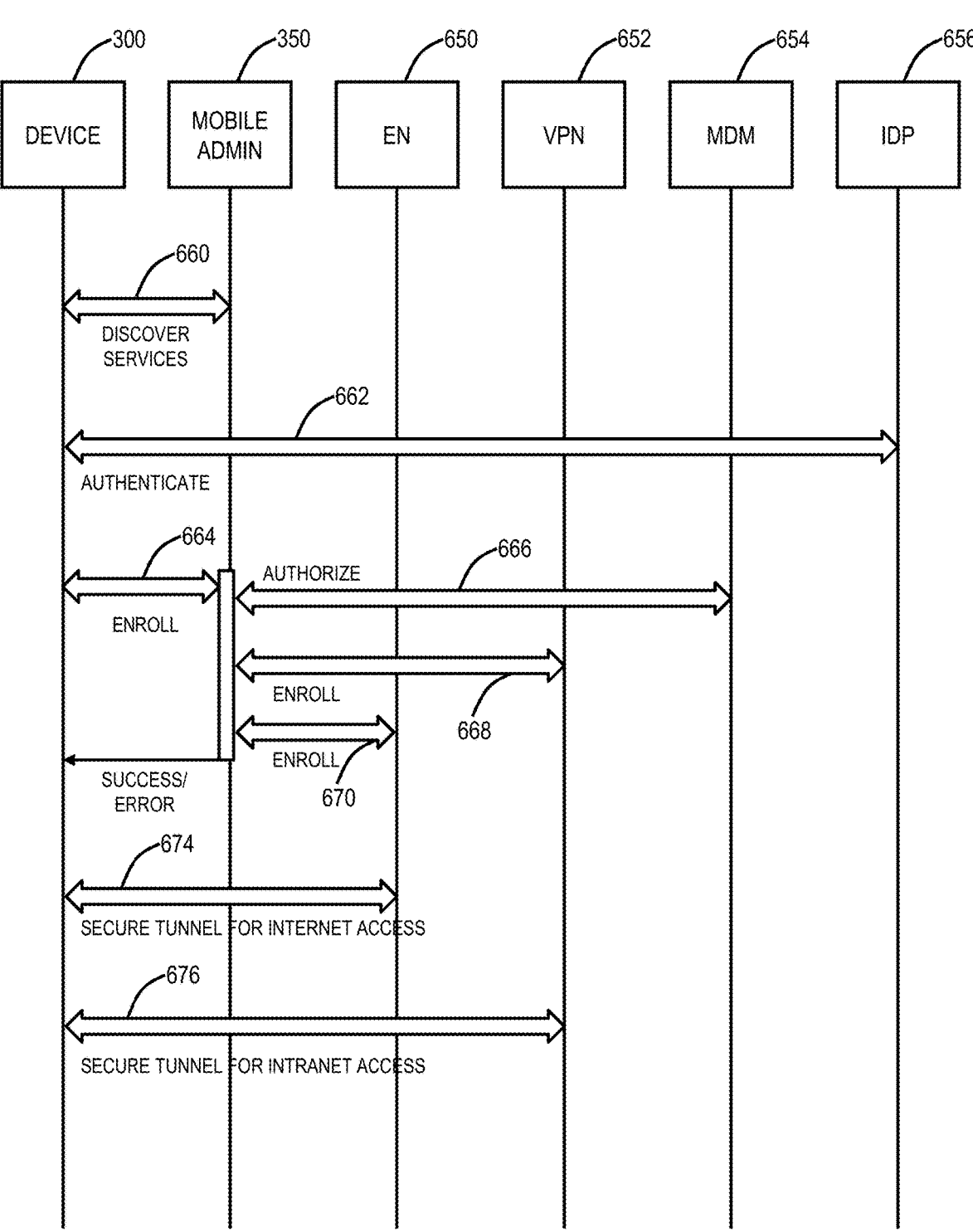
FIG. 10 is a flow diagram of an event sequence associated with the unified agent application.

FIG. 10 is a flow diagram of an event sequence associated with the unified agent application 350. The event sequence is shown between the user device 300 executing the unified agent application 350, a mobile admin function 650 such as implemented through the agent manager cloud 606, an enforcement node 150, a VPN node 652 such as through the cloud-based system 100, an MDM function 654 such as through the enterprise asset management 614, and an IDP function 656 such as through the enterprise SAML IDP 616. The user device 300 discovers services with the mobile admin function 650 (step 660), and the user device 300 is authenticated by the IDP function 656 (step 662). The user device 300 enrolls in discovered services through the mobile admin function 650 (step 664).

The mobile admin function 650 is configured to authorize the services with the MDM function 654 (step 666), enroll in the services through the VPN node 652 (step 668), and the enforcement nodes 150 (step 670). A success/error is provided by the mobile admin function 650 to the user device 300. Subsequently, the user device 300, through the unified agent application 350, accesses the services such as a secure tunnel for internet access through the enforcement nodes 150 (step 674) or a secure tunnel for intranet access through the VPN node 652 (step 676).

Unified Agent Application—Architecture

Figure 11:
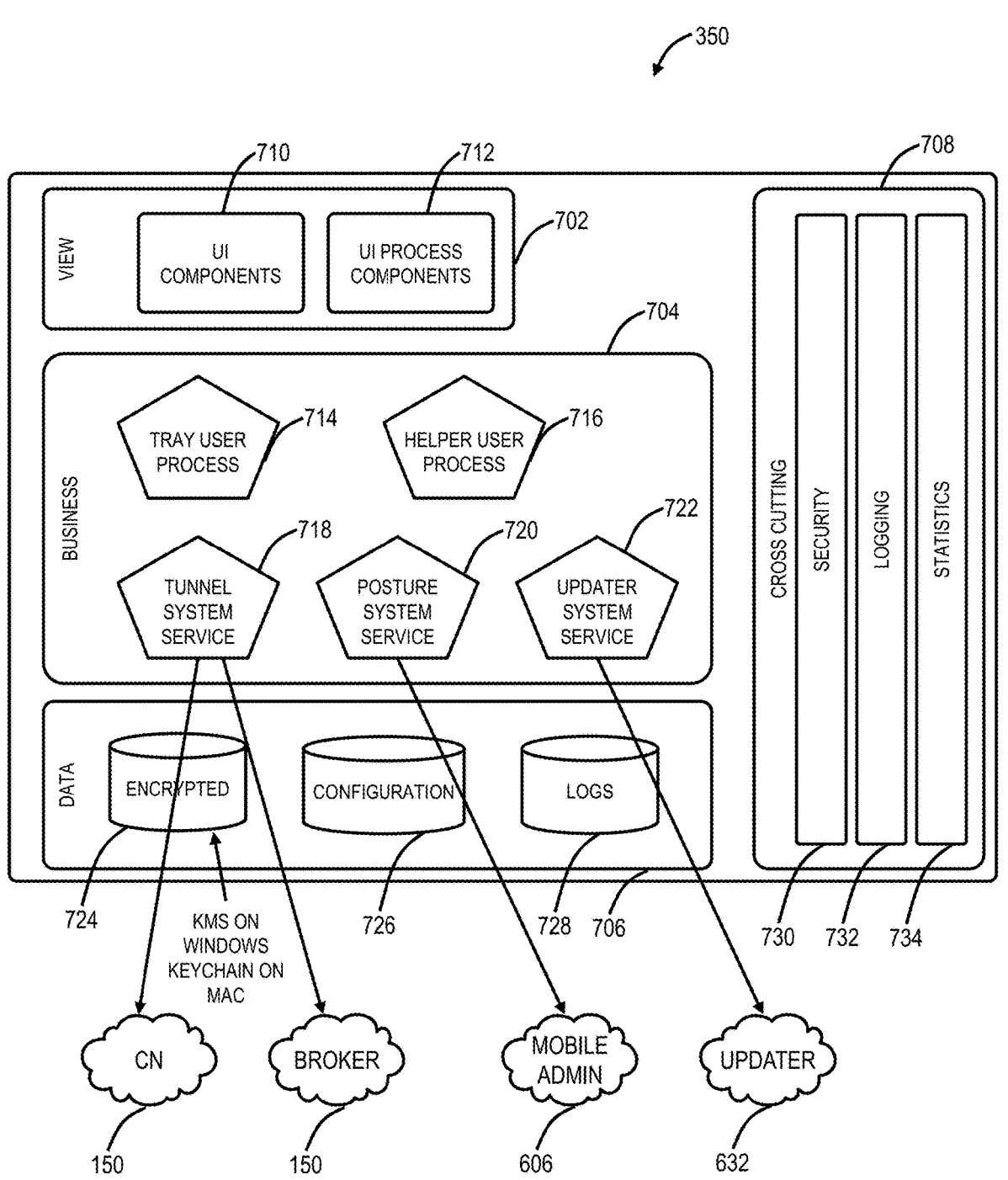
FIG. 11 is a logical diagram of functional components of the unified agent application.

FIG. 11 is a logical diagram of the functional components of the unified agent application 350. The unified agent application 350 is configured to operate on the mobile user device 300. The cloud-based system 100 can provide Internet security as well as cloud-based remote access to enterprise internal resources through a VPN. These cloud services are designed and well suited for road warriors. Road warriors are the users who are accessing the Internet 104 and enterprise internal services from outside the corporate physical network perimeter. These are the users 102 who are accessing the Internet 104 and Enterprise resources from home, airports, coffee shops, and other external unsecured hotspots.

The unified agent application 350 provides authenticated and encrypted tunnels from road warrior devices 300 and, in some use cases, it even needs to be enforceable so that end users cannot disable the unified agent application 350. The VPN, which is the remote access service, also needs authenticated and encrypted tunnel from road warrior user devices 300. Both of these solutions also need to provide feedback to the end user in the event that access was blocked due to security or compliance reasons. The following describes the architecture and design of the unified agent application 350, including an endpoint client architecture, backend changes, auto-update, and integration with the cloud-based system 100.

The unified agent application 350 includes logical components including view components 702, business processes and services 704, data 706, and cross-cutting functions 708. The view components 702 include User Interface (UI) components 710 and UI process components 712. The business processes and services 704 include a tray user process 714, a helper user process 716, a tunnel system service 718, a posture system service 720, and an updater system service 722. The data 706 includes encrypted data 724, configuration data 726, and logs 728. The cross-cutting functions 708 are across the view components 702, the business processes and services 704, and the data 706 and include security 730, logging 732, and statistics 734.

The unified agent application 350 has a useful goal of simplified provisioning of the proxy (for security through the cloud-based system 100 to the Internet 104) and the VPN (for access through the cloud-based system 100 to the enterprise private resources in the enterprise network 404). That is, the unified agent application 350 allows the use of the cloud-based system 100 as a proxy for Internet-bound communications. The unified agent application 350 further allows the use of the cloud-based system 100 as a tunnel for Intranet-bound communications to the enterprise private resources. With the unified agent application 350 setting up a local network at the user device 300, the unified agent application 350 can manage communications between the Internet and the intranet, i.e., two of the main categories of cloud services—proxy to the Internet and tunnel to the intranet. The unified agent application 350 further has objectives of simplified user enrollment in the proxy and tunnels.

In an embodiment, the unified agent application 350 is a native application. The common functionality is abstracted out and made into common libraries based on C or C++ so that it can be reused across different platforms (e.g., iOS, Android, etc.). Example functionality: Traffic forwarding tunnels, local proxy, authentication backend, logging, statistics, etc. The UI components 710 and UI process components 712 can be platform dependent. Also, the unified agent application 350 is designed and implementable such that other third-party VPN applications, if configured by the enterprise, can be used concurrently.

The app portal 632 enables the installation of the unified agent application 350 on the user device 300. For example, an admin may be able to push and install the unified agent application 350 to the user device 300 using remote-push mechanisms like GPO, MDMs, etc. Additionally, the user can download the unified agent application 350 if they have access to the installation file and install it on their own. The unified agent application 350 supports automatic updates without impacting the user's Internet experience. If a problem is encountered, then it should roll back to the previously successful state or fail open. The unified agent application 350 can have a security check to ensure that it is not tampered and updated from the right source with a hash match with a source hash when upgrading.

The user can log into the unified agent application 350. Once the user sends their User ID through the unified agent application 350 to the agent manager cloud 606, the cloud-based system 100, and/or the app portal 632, the app portal 632 can determine the company's authentication mechanism, such as through a lookup in the enterprise asset management 614, and validate password through the enterprise CA 618.

Through the unified agent application 350, a user can be authenticated to the proxy or the VPN through the cloud-based system 100. For authentication of the user to the proxy, using SAML, the user can log into the unified agent application 350 by using their user ID and transparent SAML authentication thereafter, including SAML certificate. The app portal 632 shall determine that an organization is using SAML for authentication through the enterprise CA 618 and redirect to the enterprise SAML IDP 616 to get SAML assertion and use it to authenticate the user.

For authentication of the user to the tunnel, using SAML, the user can log into the unified agent application 350 by just using their user ID and based on the user ID, the unified agent application 350 shall redirect the user for authentication to enterprise SAML IDP 616 and SAML assertion shall be sent. The VPN service shall validate SAML assertion; if the assertion is valid, then the unified agent application 350 shall collect hardware parameters like device serial number, model number, etc. and create CSR. The CSR shall be signed by the enterprise CA 618, and the certificate shall be pushed to the unified agent application 350. The unified agent application 350 shall install the certificate to KMS/keychain and save assertion.

After the user has been successfully authenticated, the user shall be enrolled in the proxy service, and the user's traffic forwarding profile shall be downloaded from unified agent application 350, including Secure Sockets Layer (SSL) certificates and exceptions. The unified agent application 350 shall indicate that the user is connected to cloud-based system 100, and app statistics shall be populated.

After the user has successfully authenticated (including transparent authentication), the user shall be enrolled with a VPN service, and the VPN broker info shall be downloaded by the unified agent application 350, and the VPN tunnel shall be established. The unified agent application 350 can support captive portal detection to fail open when users are behind a captive portal to allow connection to a captive portal.

The unified agent application 350 can forward internal enterprise traffic from the user device 300 to the VPN. The unified agent application 350 can recognize when a user goes to an internal app that is provisioned with the VPN service. The unified agent application 350 shall auto-enable a tunnel to the VPN service when the user tries connecting to an internal app. The proxy service can always be enforced, and the user is not able to remove it by switching off tunnel or removing the unified agent application 350. Without the proxy solution enforced, the user is not able to access the Internet and would be prompted to restart the web security service, via the unified agent application 350.

The VPN is an on-demand service, unlike the proxy service that shall be enforceable by default so that the user can enable/disable the VPN at will without any password requirements. Once the user logs into the VPN service using a 'Connect,' the same button shall be labeled 'Disconnect,' and the user shall be able to disconnect the VPN service with a single click. Every time user disconnects with VPN service. The VPN service can be auto-disabled if the user puts their system to sleep mode or there is inactivity (no packets exchanged) after x minutes (x shall be configurable in the VPN settings).

The admin can turn off the proxy service with a single client from an admin UI for a user, all users, or some subset of users. This does not remove the unified agent application 350 from the user device 300. A user may be able to disable the proxy service, provided they have the authority and credentials. The unified agent application 350 can provide service-related notifications to the user. For example, the unified agent application 350 can provide notifications such as push alerts or the like as well as contain a notification area for a single place to show all notifications that are generated by the proxy service and the VPN service. This shall also include app notifications, including configuration updates, agent updates, etc. The user shall be able to clear notifications as well as filter notifications from this screen. This shall include a filter for VPN/Proxy, blocked, cautioned, quarantine actions.

Unified Agent Application—User Workflow

Again, the unified agent application 350 is executed on the user device 300. For authentication, the user enters a User ID in the unified agent application 350, such as userid@domain. Subsequently, the unified agent application 350 is configured to discover the services enabled—proxy service and VPN services based on userid@domain. The user authenticates with the presented services, i.e., proxy service, VPN services, and combinations thereof. The unified agent application 350 is auto-provisioned for the authenticated service by downloading the service-specific configuration. The unified agent application 350 performs the following during VPN enrollment—get the User/Device certificate signed by an Enterprise Intermediate Certificate. This Intermediate Certificate will be the same, which will be used for signing Assistants. The unified agent application 350 also will pin hardware signatures/fingerprints to the certificate and user, e.g., Storage Serial ID (Hard Drive Serial ID), CPU ID, Mother Board Serial ID, BIOS serial number, etc.

Unified Agent Application—Authentication and Enrollment Protocol

FIG. 12 is a flowchart of a proxy authentication process 750 to the cloud-based system 100. For authentication in the proxy service, conventionally, devices 300 can use proxy authentication to register to the cloud-based system 100. This is not truly reliable as it depends on location/location-authentication policy/VPN and other such factors to work correctly. To simplify this flow, the following new flow can be used with the unified agent application 350 for the process 750. First, the mobile client user device 300 initiates an HTTPS request to a CA (e.g., the enterprise CA 618) (step 752). For example, this can be as follows:

login.zscalernet/
        clstart?version=1&_domain=nestle.com&redrurl=<url-encoded-url-with-schema>
    If the domain is invalid or if the redrurl is missing, CA will reset the connection.

The above endpoint begins the client auth flow (step 754). The provided domain is the company that requires the auth. The CA looks up the domain to find the company and their auth mechanism. If the company uses hosted or Active Directory (AD)/Lightweight Directory Access Protocol (LDAP) authentication [SAML auth flow starts at step 760], the response will be a login form with input fields for [username] & [password] (step 756).

The form is submitted via POST to the CA at a below endpoint:

```
https://login.zscaler.net/clicred. The HTTP content may look like below
POST /clicred
Host: login.zscaler.net
Content-Length:
xyzusername=xyz@nestle.com&password=123456&redrurl=<url-encoded-posturl-with-schema>
```

Next, the CA performs user/password validation and responds with a message (step 758). If the company uses SAML, the response to the request in step 752 will be the SAMLRequest form. The SAMLRequest form will auto-submit to the IDP. Once auth completes, the CA gets control back with the identity of the user. Once SAMLResponse comes back, send the response as a 307 redirect to redrurl (step 762) with a below format

```
Location: zsa://auth[?token=encrypted-cookie&...] to be appended.
307 query params
----------------
token= (on success)
ecode= (on error)
emsg= (on error)
On error, send the same redrurl with below format
zsa://auth?ecode=<code>&emsg=<message>
```

FIG. 13 is a flowchart of a VPN authentication process 780 to the cloud-based system 100. The client (user device 300) issues a GET web request to the VPN authentication server with the domain name as the query parameter (step 782), such as:

GET //<auth-server>?domain=mockcompany.com

The server identifies the IDP for the given domain and responds with a Hypertext Markup Language (HTML) page containing a SAML Request (step 784). The client will redirect to the IDP with the SAML Request (step 786). The IDP will challenge the client for credentials, which can be of the form of a username/password or client identity certificate (step 788). On successful authentication, IDP will generate a SAMLResponse for the VPN authentication server (step 790). The client will record the SAMLAssertion for future tunnel negotiation. In the case of error, the server will resend the challenge to the user (step 792).

FIG. 14 is a flowchart of a device enrollment process 800 for the client user device 300 and the unified agent application 350. Post successful authentication with all services, in this case, the proxy services, and the VPN services, the client sends an enrollment request to mobile admin (Cloud Administrative Server CAS) (step 802). The request contains a device fingerprint and an authentication context for each service to identify the user (step 804). For example, the cloud-based system 100 can use cookies, and the VPN can use SAMLAssertion for the authentication context. The mobile admin (agent manager cloud 606) performs inventory lookup with device fingerprints at the MDM server to authorize the user and the user device 300 (step 806). On successful authorization, the mobile admin server enrolls the user to cloud services with their authentication contexts (step 808). Each cloud service responds with specific access controls and protocol information that the client receives from mobile admin and uses for local network setup (step 810).

Unified Agent Application—Traffic Interception and Splitting

Again, to protect Internet-bound traffic and simultaneously access enterprise-specific Intranet traffic, the user device 300 needs to connect through multiple applications. Again, it is not straightforward for users to configure these applications in different networks, and different VPN and proxy solutions arise compatibility issues when operating simultaneously. The unified agent application 350 is designed to solve all these issues. The unified agent application 350 handles both proxy (Internet-bound) traffic, and Enterprise Intranet bound traffic. The unified agent application 350 provides secure access to Organizational internal resources when the user is outside of the enterprise network. For Internet-bound traffic, it will forward traffic to the enforcement node 150, and for intranet bound traffic, it will forward traffic to a VPN (Broker) or direct if the user is inside the organization network.

The unified agent application 350 is configured to intercept all traffic, specifically to intercept all Transmission Control Protocol (TCP) traffic and DNS traffic before it goes out through the external network interface in the user device 300. The unified agent application 350 can intercept other types of traffic as well, such as the User Datagram Protocol (UDP). The unified agent application 350 is configured to split traffic at the user device 300, i.e., based on a local network configured at the user device 300. Split traffic based upon port, protocol, and destination IP. The unified agent application 350 is configured to send VPN traffic direct for trusted networks (organization's internal network). The unified agent application 350 can also coexist with other VPN clients, i.e., it does not intercept the traffic targeted for those interfaces by specific routes.

Thus, the unified agent application 350 is configured to intercept all traffic at the IP layer for the device 300 or other VPN client's default route. Then, the unified agent application 350 is configured to split traffic. Based upon port, protocol, and destination IP as configured by the IT administrator FIG. 15 is a flowchart of a traffic interception process 820 implemented through the unified agent application 350. The unified agent application 350 registers and sets up a new Network Adapter (TUN interface) on the device (step 822). The unified agent application 350 overrides the device's network default route by configuring the default route of higher priority for the TUN interface (step 824). The unified agent application 350 sets a specific route (exact match) for all DNS servers configured on the user device 300 with the highest priority (step 826). The unified agent application 350 will not override other specific routes of an external adapter or other VPN clients (step 828).

For each IP packet coming to the TUN interface, packet processing is performed (step 830). The application does a <port, protocol, destination-IP> lookup on every IP packet and sends it on one of the dedicated tunnels based upon configured rules of packet transport.

Figure 16:
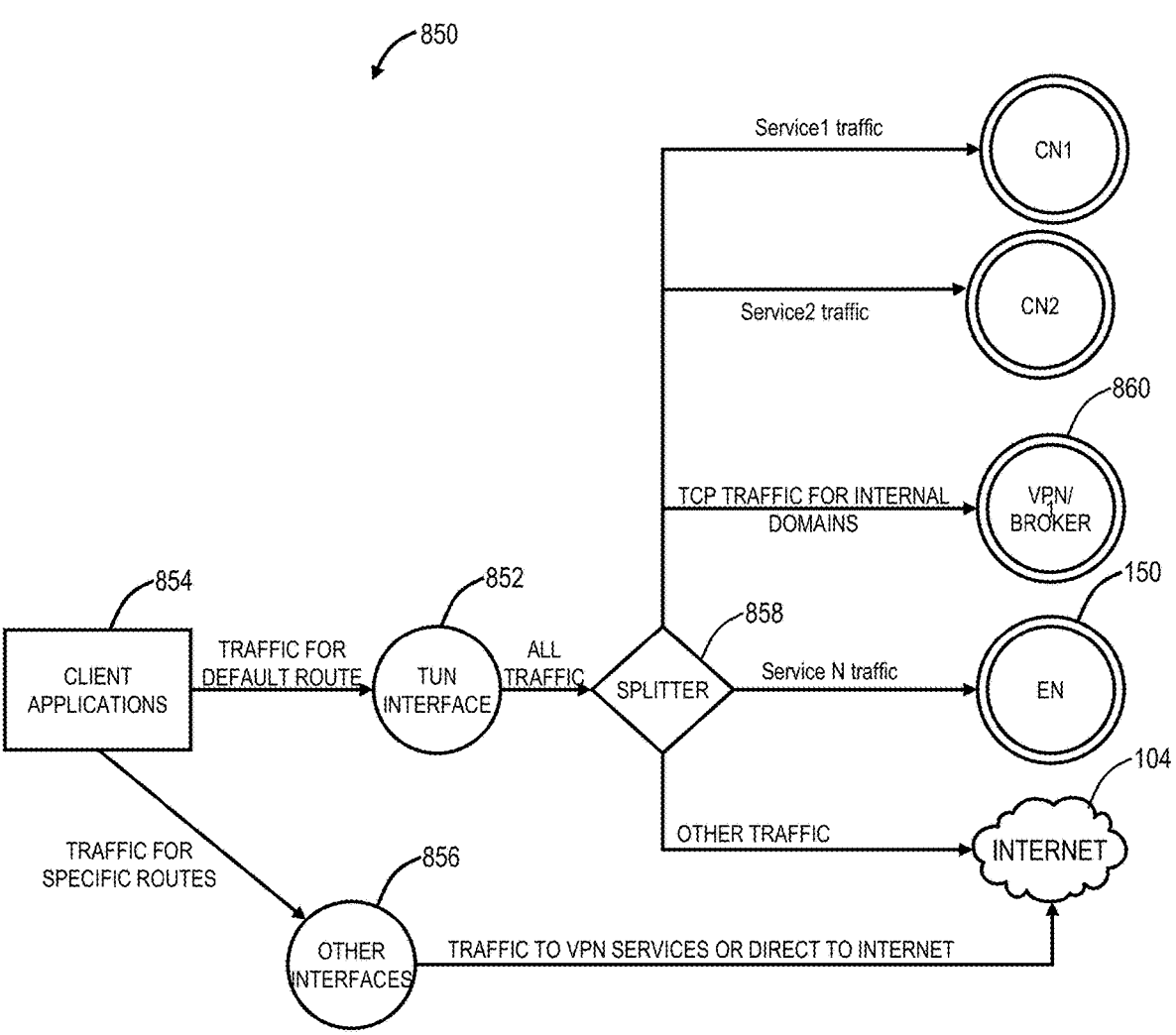
FIG. 16 is a flow diagram of traffic interception and splitting using the unified agent application.

FIG. 16 is a flow diagram of traffic interception and splitting 850 using the unified agent application 350. Again, the unified agent application 350 creates and operates a tunnel (TUN) interface 852 on the user device 300. The user device 300 includes one or more client applications 854, which can be any program or service executable on the user device 300, which requires access to the network interface on the user device 300. Traffic for the default route from the client applications 854 is sent to the TUN interface 852, but traffic for specific routes can be sent to other interfaces 856, separate from the TUN interface, for direct connectivity to the Internet 504, such as via VPN services or direct.

The TUN interface 852 splits 858 all traffic. TCP traffic for internal domains is sent to a VPN/broker server 860, TCP port 80/443 traffic is sent to the cloud-based system 100 for a proxy such as to the enforcement node 150. Finally, other traffic can be sent directly to the Internet 504. In this manner, the TUN interface 852 operates a local network at the user device 300.

Figure 17:
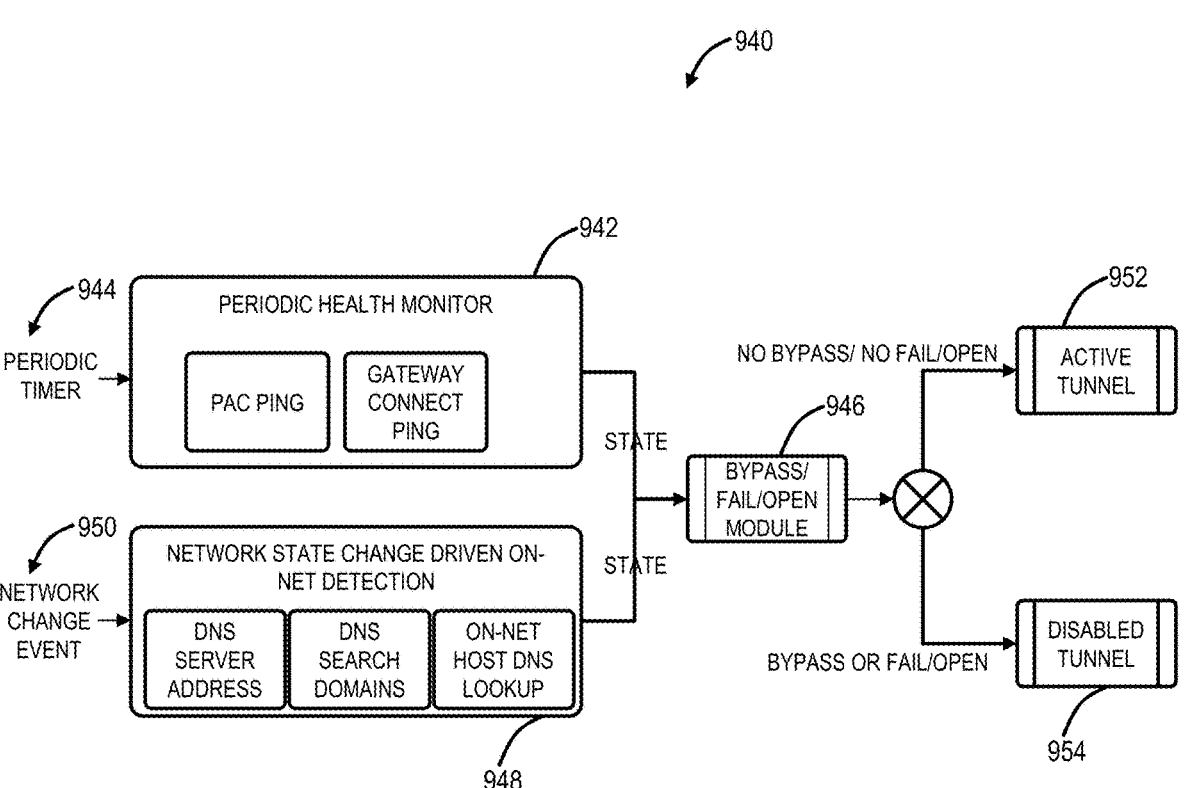
FIG. 17 is a flow diagram of tunnel forwarding rules by the unified agent application.

FIG. 17 is a flow diagram of tunnel forwarding rules 940 by the unified agent application 350. A periodic health monitor function 942 operates, based on a periodic timer 944, to check a PAC ping and a gateway connect ping to provide a state to a bypass fail/open module 946. A network state change function 948 is configured to detect a network change event 950 such as DNS server address, DNS search domains, on-net host DNS lookups, etc., and to provide a state to the bypass fail/open module 946. The bypass fail/open module 946 creates an active tunnel 952 or disabled tunnel 954 based on the states.

Service Driven Split Tunneling

FIG. 18 is a flowchart of a service driven split tunneling process 1000. The service driven split tunneling process 1000 provides better scalability, security, and segmentation of traffic in mobile and cloud environments. The service driven split tunneling process 1000 can include the traffic interception and splitting 850 using the unified agent application 350. Again, as illustrated in FIG. 18, the unified agent application 350 creates and operates a tunnel (TUN) interface 852 on the mobile user device 300. The mobile user device 300 includes one or more client applications 854, which can be any program or service executable on the user device 300, which requires access to the network interface on the user device 300. Traffic for the default route from the client applications 854 is sent to the TUN interface 852, but traffic for specific routes can be sent to other interfaces 856, separate from the TUN interface, for direct connectivity to the Internet 504, such as via VPN services or direct.

The service driven split tunneling process 1000 includes a mobile application/agent which is installed on a mobile device for packet interception (step 1002). For example, the mobile application/agent can be the unified agent application 350 on the mobile user device 300. The mobile application/agent can inject a default route on the mobile device pointing to its own interface to get all Layer 2 or Layer 3 packets.

The mobile application/agent is configured with a set of rules (step 1004). The set of rules can be learned at runtime (as the mobile application/agent operates, configured at application launch, configured during application operation, and a combination thereof. For example, the set of rules can be configured by IT administrators for specific users, groups, departments, etc. and sent to the mobile application/agent. Further, the set of rules can be learned based on the operation of the mobile application/agent.

The set of rules can be an array of tuples of included and excluded traffic. For example, the array of tuples can include the following format

```
<exclude, destination_port, protocol, destination_IP address_subnet>
<include, destination_port, protocol, destination_IP address_subnet, transport_type>
```

For example, a set of rules can include
<include, 443, TCP, 17.0.0.0/8, <TCP, gateway.zscaler-.net:80
This rule would tunnel all TCP port 443 traffic destined to 17.0.0.0/8 subnet over a TCP transport on port 80 to host.com. Another rule can include
<exclude, 53, UDP, *>
This rule does not tunnel any UDP port 53 (DNS) traffic, but rather sends it direct.

Based on the set of rules, the mobile application/agent opens tunnels to different host concentrators (step 1006). As described herein, the host concentrators can be the enforcement nodes 150, etc. The tunnel may or may not be authenticated depending upon the requirements. For the traffic that needs to go direct, the mobile application/agent proxies the connections locally through a RAW Socket or via a custom TCP/IP Stack embedded within the application itself.

The mobile application/agent intercepts packets on the user device and forwards over the tunnels based on the set of rules (step 1008). Through this granular splitting of network traffic, IT administrators will have better control of the network traffic in terms of security and scalability. For instance, an IT admin can now control that only special traffic such as Session Initiation Protocol (SIP) should go outside the tunnel, and rest should go to some security gateway or vice versa. Any number of complex rules is hence possible.

End users will also have significant performance benefits over traditional SSL/IPSec VPNs where traffic of different needs compete with each other. The service driven split tunneling process 1000 allows function-driven security and on-demand scalability for different services. So, File Transfer Protocol (FTP) traffic goes to a secure FTP proxy, Web traffic (TCP, port 80 traffic) goes to a Web proxy, HTTPS (TCP, port 443) goes to an SSL acceleration proxy, SIP traffic goes to SIP traffic processing concentrator and so on.

Hybrid Architecture for Security Processing

Again, the present disclosure relates to mobile devices, which are one subset of the user device 300, referred to herein as a mobile device 300. The present disclosure relates to systems and methods for enforcing security policies on mobile devices 300 in a hybrid architecture. Here, the hybrid architecture means security processing occurs both via the application 350 and the cloud-based system 100 in a unified and coordinated manner. The hybrid architecture utilizes the application 350 first to generate a local decision about whether to BLOCK/ALLOW connections based on a local map. If a connection is not in the local map, the application 350 forwards a request to the cloud-based system 100 to generate a decision. In this manner, the hybrid architecture decreased bandwidth consumption between the mobile device 300 and the cloud-based system 100 by utilizing previous BLOCK information. The hybrid architecture decreases processor utilization on the mobile device 300 by relying on a cloud service through the cloud-based system 100 for calculating request signatures, detecting malware, detecting privacy information leakage, etc. That is, the application 350 makes simple decisions—ALLOW or BLOCK, and the cloud-based system 100 does advanced processing where needed, sandbox, advanced threat detection, signature-based detection, DLP dictionary analysis, etc.

This approach also decreases the average latency, specifically for blocked requests. A user 102 gets an immediate block as opposed to a delay based on an exchange with the cloud service. Finally, this hybrid architecture approach increases the coverage of security policies/signature-based checks on mobile devices 300, because the cloud based system 100 has significant processing capability relative to the mobile device 300. Here, the application 350 is coordinating with the cloud service. The actual policies are configured in a cloud portal of the cloud-based system 100 and immediately promulgated to corresponding mobile devices 300. The application 350 serves as a gatekeeper to process simple requests, namely BLOCK/ALLOW connections, based on entries in a local map. The cloud-based system 100 processes complex requests, where entries are not in the local map or where other security policies require, such as where data requires DLP analysis, etc. Again, mobile devices 300 have limited battery, storage, processing capabilities. The application 350 is lightweight and operates considering these limitations. The local map can be referred to as a cache of security policies.

FIG. 19 is a flowchart of a process 1100 for security processing in a hybrid architecture. The process 1100 is described with reference to steps at a mobile device 300, and those skilled in the art will recognize functions are also performed in the cloud-based system 100. The process 1100 contemplates implementation as a method, via the mobile device 300, and as computer-executable instructions stored in a non-transitory computer-readable medium.

The process 1100 includes intercepting traffic on the mobile device 300 based on a set of rules (step 1102); determining whether a connection associated with the traffic is allowed based on a local map associated with an application 350 (step 1104); responsive to the connection being allowed or blocked based on the local map, one of forwarding the traffic associated with the connection when allowed and generating a block of the connection at the mobile device 300 when blocked (step 1106); and, responsive to the connection not having an entry in the local map, forwarding a request for the connection to a cloud-based system 100 for processing therein (step 1108). The cloud-based system 100 is configured to allow or block the connection based on the connection not having an entry in the local map.

There can be multiple different local maps, such as a firewall map, a domain map, and an HTTP request map. The firewall map can be the first map to consult for every connection. It has rules based on destination IP address, protocol, and port. The domain map, after the firewall map, can be consulted for HTTP and HTTPS connections. For HTTP, the application 350 can use the domain in the HTTP host header, and for HTTPS, the application 350 can use Server Name Indication (SNI). After the domain map, the HTTP domain map is consulted for HTTP requests, this map will have different set of rule categories such as: a) HTTP request type: Match HTTP domain (optional) and request type like GET/POST/HEAD, etc., b) HTTP header: Match HTTP request header key:value (optional) pairs and domain (optional), c) HTTP Version: Match Http version and domain (optional), d) Whole HTTP payload: Match http request payload SHA256 hash by excluding specific request headers.

The process 1100 can further include receiving an update from the cloud-based system 100 based on the forwarding the request to the cloud-based system 100; and updating the local map based on the update. Here, the application 350 is configured to cache previous decisions that were made by the cloud-based system 100. The process 1100 can further include receiving periodic updates from the cloud-based system 100; and updating the local map based on the periodic updates. Here, the periodic updates can be based on new security policies for a tenant of the user, detections of connections as malware or other malicious content for blocking, etc. The periodic updates can be based on monitoring in the cloud-based system and on policy of a tenant associated with a user of the mobile device.

The process 1100 can also include timing out entries in the local map and removing timed out entries. Here, the local map can have entries purged over time. This is not an issue as the fallback for any connection not found in the local map is processing in the cloud-based system 100. Thus, the local map does not need to have every possible connection entered in the local map; only ones that are used regularly. Each object within the map can have their own timeout determined based on the nature of block, e.g., for a firewall block, it can be more, and, for HTTP request payload block, it could be less.

In an embodiment, the traffic includes Hypertext Transfer Protocol (HTTP) and HTTP Secure (HTTPS) requests. The application 350 can intercept the HTTP/HTTPS requests on the mobile device 300 by means of route based rules. The routes added by the application 350 redirect all the traffic to itself via a virtual tun/tap adapter. For each incoming HTTP/

HTTPS request, the application 350 consults the local map indicating if the connection needs to be blocked. In the case of BLOCK, it generates a local BLOCK response and sends it to the client application that generated the traffic. If the entry for this particular connection does not exist in the local map, the request is forwarded to the cloud service. Every BLOCK response from the cloud service can be saved locally in the local map for future consultation. There are several types of maps maintained on the client based on the type of BLOCK received from the cloud service. The process 1100 also contemplates non-HTTP/HTTPS traffic as well.

For a firewall map, if the request is forwarded to the cloud, a cloud firewall can provide the BLOCK and the decision can be provided to the local firewall map for future traffic. The updates between the application 350 and the cloud-based system 100 can be based on a tunnel. For example, a tunnel used between the mobile device 300, the application 350, and an enforcement node 150 can include information exchanged related to BLOCKs and the associated reasons. For example, DLP_VIOLATION, PROTOCOL_ACCESS_DENIED, etc. The local map can be populated based on the tunnel data.

Disaster Recovery

As described herein, the cloud-based system 100 is designed to have high availability through redundancy, the nodes 150 being in clusters, the nodes 150 being geographically distributed, etc. Also, as described herein, the cloud-based system 100 is configured to perform security processing functions. An example of the security processing functions can include allowing or blocking data traffic. Another example of the security processing functions can include the ZTNA where the cloud-based system 100 stitches the applications 402 and the software 400 together, on a per-user, per-application basis. In normal operation, the cloud-based system 100 is available to perform the security processing. Also, in normal operation, the cloud-based system 100 can work with the mobile device 300 in a hybrid architecture.

The present disclosure contemplates use of the local map described above with the application 350 with various user device 300 (not just mobile devices 300) in the context of disaster recovery. Disaster recovery means the cloud-based system 100 is not available for a user device 300 to provide security processing. The disaster can be unavailability of one or more of the nodes 150 in the cloud-based system 100, unavailability of the entire cloud-based system 100, network congestion, network failures, etc. That is, a disaster means the cloud-based system 100 is unavailable for any reason to perform security processing.

FIG. 20 is a flowchart of a process 1120 for disaster recovery via the hybrid architecture, i.e., cached policies on the user device 300. The process 1120 contemplates implementation as a method, via the user device 300, and as computer-executable instructions stored in a non-transitory computer-readable medium. The process 1120 includes intercepting traffic on the user device (step 1122); forwarding the traffic to a cloud-based system for security processing therein (step 1124); and, responsive to unavailability of the cloud-based system preventing the forwarding, performing local security processing of the traffic at the user device including determining whether the traffic is allowed based on a cache at the user device, forwarding the traffic separate from the cloud-based system when it is allowed, and blocking the traffic when it is not allowed (step 1126).

The user device 300 may or may not utilize the application 350. The user device 300 is configured to intercept outbound traffic, such as described herein, to send to the cloud-based system 100 for security processing therein. The user device 300 can determine the cloud-based system 100 is unavailable for the forwarding, and then perform the local security processing. In an embodiment, the local security processing includes a local allow/block of traffic based on cached policies, e.g., in the local map.

The process 1120 can further include updating the cache based on the forwarding and actions taken by the cloud-based system (step 1128). That is, in an embodiment, the cache can be based on monitoring the user's activity, the decision by the cloud-based system 100, e.g., block/allow, and storing the same in the cache. The process 1120 can further include obtaining a list for the cache that contains pre-configured domains (step 1130). Here, the cloud-based system 100 can provide a pre-configured list. For example, the list can be based on a tenant associated with the user device 300. Also, the list can be based on a list of top domains, such as from Alexa or the like. Also, the cache can be a combination of a pre-configured list and learned behavior from operation.

In an embodiment, for the local security processing, the traffic is blocked based on a domain included in the cache. That is, the cache can include blocked domains as well as possible allowed domains. In another embodiment, for the local security processing, the traffic is blocked based on a domain not being in the cache. Here, the cache is an allowed list and any domain not in the cache is blocked. Of course, the local security processing can include any of these operational approaches.

The process 1120 can further include maintaining access logs locally at the user device for the local security processing; and forwarding the access logs to the cloud-based system after it is available. Here, there can be some amount of logging locally maintained while the cloud-based system 100 is unavailable to ensure visibility. The unavailability can be based on the cloud-based system being down beyond a threshold. The local security processing can be configured by a tenant. For example, a tenant may allow this local security processing as well as prevent it (here, unavailability of the cloud-based system 100 would mean no network access).

The local security processing can include other approaches besides allowing/blocking a domain. For example, the local security processing can include Zero Trust Network Access to an application included in an enterprise network, and the process 1120 can include providing a secure connection to the application 402 included in the enterprise network 404 based on the cache. Other local security processing techniques can include DLP and the like.

Disaster Recovery for Cloud-Based Monitoring of Internet Access

Present systems and methods allow for customized disaster recovery configurations for specific tenants, clients, users, etc. Such configurations can be enabled per application profile allowing configurations to be group based. Various configurations allow for different actions to take place in the event of a disaster recovery requirement. In various embodiments, configurations set for disaster recovery can cause systems to send traffic directly, disable internet access, allow traffic to preselected destinations (i.e., an allowed list of destinations), and the like. FIG. 21 is an embodiment of a disaster recovery configuration page.

Preselected destinations can include global default destinations preselected by a cloud provider (default lists), customer defined destinations (customer lists), and a combination thereof. These preselected destination lists can cause systems to allow or block the entries in the lists. In various embodiments, when the "allow traffic to preselected destinations" mode is chosen, and a default list and one or more customer lists exist, systems can be adapted to first check the customer lists before consulting the default list. Also, in various embodiments, if selected, customer defined items will win in the event of a conflict between default preselected destinations and customer defined destinations. Thus, the customer defined destination lists take priority over the global default destination list. Customer defined lists of destinations can be structured as a Proxy Auto-Configuration (PAC) file.

In order for a user (administrator) to configure a disaster recovery mode which disables internet access, the administrator can navigate to a specific tenant in the configuration page. In an application profile, various options can be edited including enabling a disaster recovery option. Responsive to the disaster recovery option being selected, an activation domain name can be configured. For the configured domain name, a TXT record can be created (discussed further herein). In order to disable internet access in response to the disaster recovery mode being enabled, a "disable internet access" option is selected in the configuration page. To verify the operation, the TXT record is changed to activate disaster recovery mode for monitoring of internet access. All access to any internet websites should not work responsive to the activation.

In order to set other configurations such as send traffic direct, and allowing based on pre-selected destinations, the steps are the same but include selecting the associated configuration in the configuration page (i.e., send traffic direct, and allow traffic to pre-selected destinations. Similarly, the disaster recovery can be tested, where all access to all websites will be allowed for the "send traffic direct" mode, and only websites from the predefined list will be allowed access for the "pre-selected destinations" mode.

Disaster Recovery for Cloud-Based Private Application Access

Present systems and methods additionally allow for customized disaster recovery configurations for private application access. Such configurations can be enabled per application profile allowing configurations to be group based. Again, various configurations allow for different actions to take place in the event of a disaster recovery requirement. In various embodiments, configurations can cause systems to provide private application access during disaster recovery.

In order to configure disaster recovery for private application access, a DNS domain is provided on a mobile admin to push it to a client connector and on a private access admin UI to push it to a Private Service Edge (PSE). In various embodiments, disaster recovery must be enabled on one or more PSEs, application segments, and application connectors. Such configurations can be enabled in a private access portal.

Figure 22:
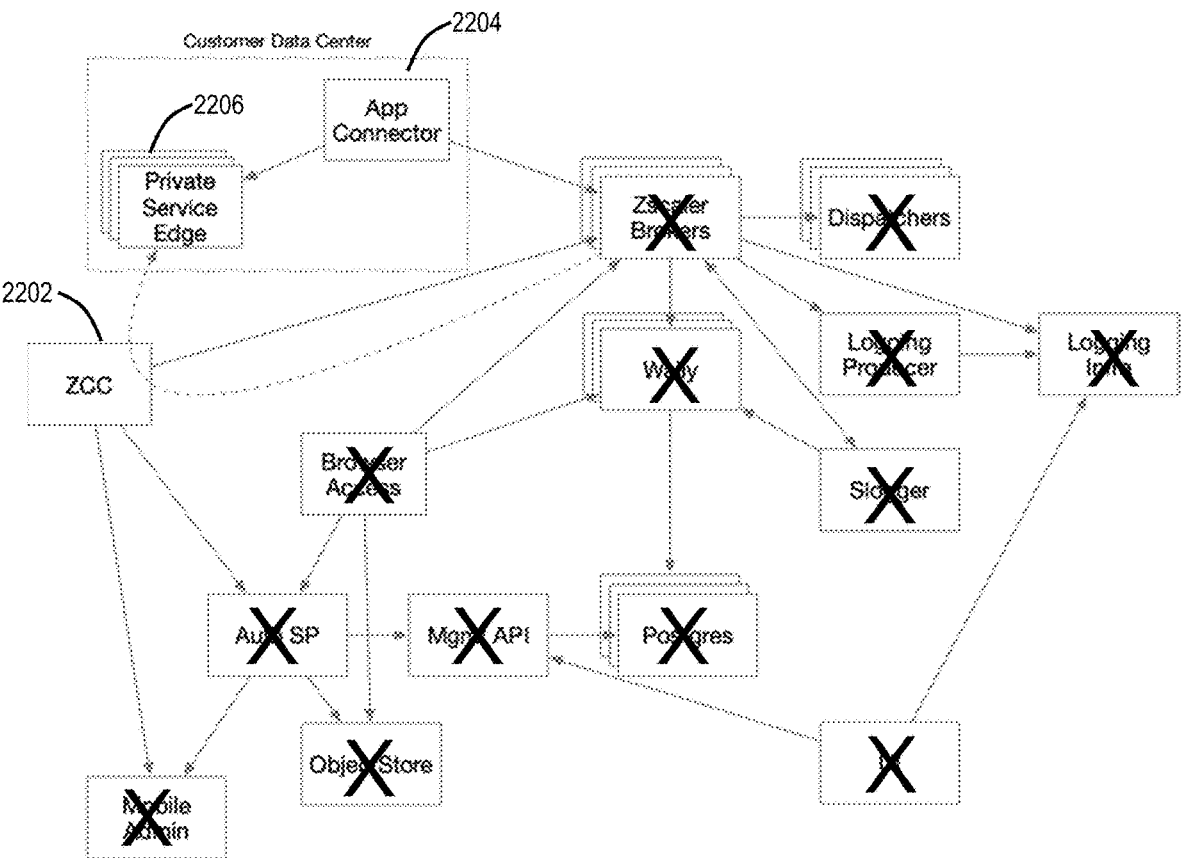
FIG. 22 is a network diagram of the cloud-based system during activation of disaster recovery.

FIG. 22 is a network diagram of the cloud-based system during activation of disaster recovery. In the event of the disaster recovery mode being enabled, various functions are not available including logging, per-user authorization, browser access, enrollment of new clients, configuration changes, and the like. In various embodiments, log buffering can be implemented on disk for one or more PSEs. With disaster recovery mode, traffic forwarding and access to key applications for partly-authorized users (i.e., via client connector enrollment certificate) is available. The intention of disaster recovery is to be utilized during a cloud outage. Third parties are needed to trigger disaster recovery due to the cloud being out of service. In various embodiments, DNS allows for customer specific disaster recovery activation. Additionally, DNS records can be signed to ensure anti-tampering.

In various embodiments, a DNS record generation tool can be used to activate DNS recording. A user can install the DNS record generation tool and run as an administrator. The administrator can then chose to sign the DNS record name used to trigger disaster recovery. Further, the administrator can chose to enable the disaster recovery domain name, disable the disaster recovery domain name, or test the disaster recovery mode. Disaster recovery can then be started with an associated start time. A default end time will be presented with the interface allowing the user to accept the default time (for example, 7 days later), designate a custom end time, or ignore the end time request resulting in no expiration. The resulting DNS TXT record is provided.

In various embodiments, a test mode can be enabled, wherein the test mode triggers disaster recovery without DNS changes. It allows for testing of disaster recovery without company (enterprise) impact, while policy updates notify devices to activate disaster recovery mode.

Disaster recovery mode is an alternative to the standard logical law and system behaviors that govern various private access components. Such components can include client connectors 2202, application connectors 2204, and Private Service Edges (PSEs) 2206. Disaster recovery mode is preconfigured before a disaster, wherein the configuration determines various characteristics. The configuration can specify alternative endpoints (and propagate/cache them to the aforementioned components), activation criteria, application configuration (i.e., specifically what applications are allowed to function), and authentication (or no authentication). In various embodiments, disaster recovery can be manually activated via an activation switch which is protected from abuse. Additionally, disaster recovery mode can self-activate in specific scenarios. In embodiments, disaster recovery mode can deactivate automatically if it believes the system is capable of servicing traffic normally. For example, the disaster recovery mode can regularly check (at preconfigured time intervals) if the system is capable of servicing traffic normally. This can be manually overridden if automatic deactivation turns out to be wrong.

In an example use case, a cloud provider can push out a bad code update for private application access systems. During revert, all systems can be corrupted and become complete unreachable with no ETA for the service to come back online. Customer administrators can make the decision to go into disaster recovery mode for private application access. When enabled, users with client connector can still access internal applications or require a PSE if the configurations require. Access to such applications is not exposed to unauthorized users. Various embodiments can also include roll based access on which users can activate disaster recovery mode.

In various embodiments, when disaster recovery mode is enabled, transactions are logged (can be stored and sync'd later), on premises users (without client connector) can also access internal applications, browser only access is allowed for roaming users, and users are notified that they are temporarily in disaster recovery mode. Embodiments also allow (if configured) automatic failover if private application access systems are down and disaster recovery cannot be manually activated.

The various solutions described herein provide VPN-like access to private applications using private application access infrastructure and PSEs. Various approaches rely on a local config files being present at application connectors and PSEs during a disaster or when the cloud is unavailable. Configurations can be overridden locally via local config files, where local and cloud config files can co-exist and local config files take precedence over cloud config files. Again, config files on connectors and PSEs dictate what is accessible during an event (when disaster recovery is activated).

Private Broker Disaster Recovery

Figure 23:
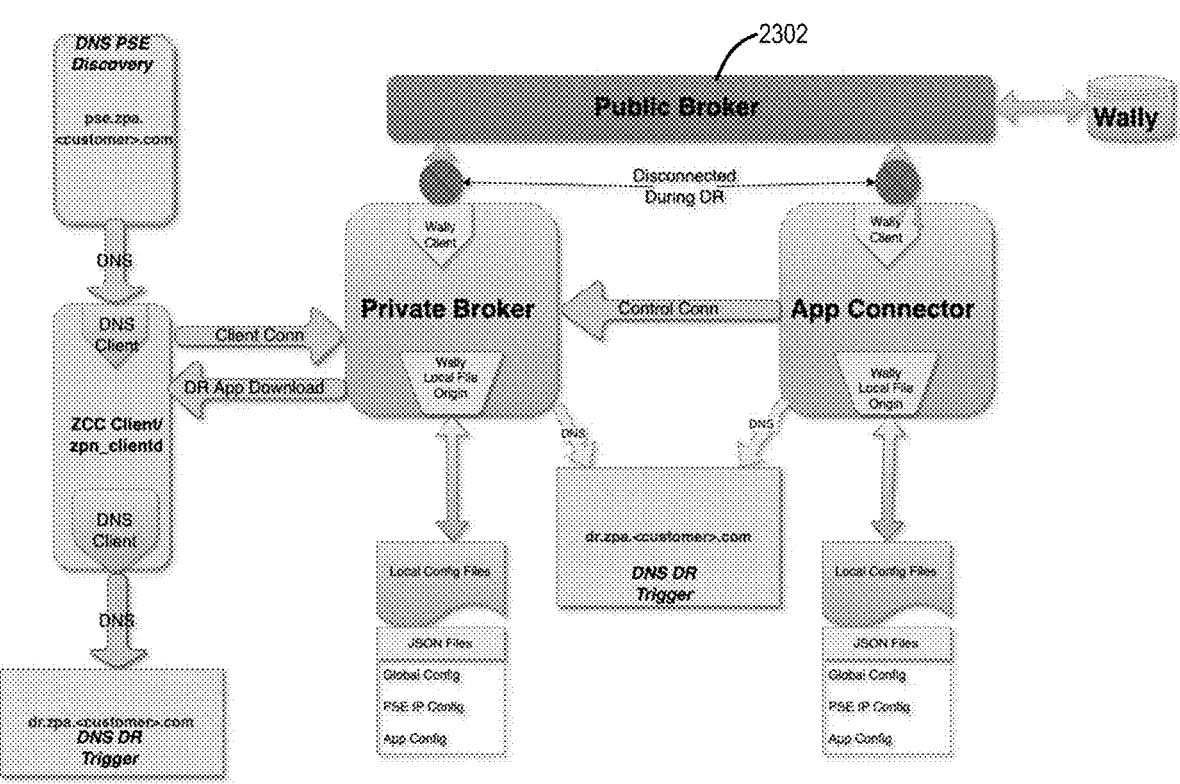
FIG. 23 is a network diagram of private broker disaster recovery components.

FIG. 23 is a network diagram of private broker disaster recovery components. Prior to a disaster recovery event, an administrator associated with the cloud-based private application access creates a cloud configuration which includes designating disaster recovery mode applications and PSEs via an administrator UI. The cloud configuration is distributed to PSEs and application connectors (cloud-based system components). Both the PSEs and application connectors write a copy of their cloud configurations into local configuration files (or update existing configuration files) if configuration has changed. Normal application access continues for the entire set of applications.

During a disaster recovery event, an administrator associated with the customer initiates disaster recovery mode and sets a DNS TXT-record key to a special secure value to trigger disaster recovery mode. The administrator additionally sets DNS A-record to point to a desired set of preselected disaster recovery PSE instance IP's. It is noted that disaster recovery for cloud-based monitoring of internet access, and disaster recovery for cloud-based private application access can be activated individually or separately. Responsive to activation of disaster recovery for cloud-based private application access, both PSEs and application connectors check if the DNS disaster recovery trigger is on. Both application connectors and PSEs switch to disaster recovery mode by restarting. Both application connectors and PSEs read a copy of their cloud derived configurations from their configuration files. All application connectors connect to disaster recovery mode PSEs based on the PSE IP configuration. PSEs load all disaster recovery mode applications based on the application list in the configuration file. Client connectors detect that the DNS disaster recovery trigger is on via the TXT record and connect to a disaster recovery mode PSE by resolving and using a PSE IP for DNS A-record name. The list of disaster recovery applications is downloaded to the client connectors based on the disaster recovery applications listed in the configuration file. The client connectors will forward tunnels from disaster recovery applications to the PSEs to connect.

Various embodiments contemplate the use of automated configuration file generation. Again, when connected to the public broker 2302, data is received to generate local copies of cloud derived PSE configurations. Separate configuration files can include global configuration files, application list configuration files, PSE IP configuration files, and the like. The various configuration files are subsequently organized into two distinct hierarchies including cloud derived configurations and local overridden configurations. Separate configuration files for different parameters are organized into files including current disaster recovery on/off status (global configuration file), PSE IP list (PSE IP configuration file), authentication interval during disaster recovery mode (global configuration file), disaster recovery application list (application list configuration file), authorization timeout (global configuration file), IDP configuration (global configuration file), etc.

Similarly, when connected to the public broker 2302, data is received to generate local copies of cloud derived application connector configurations. As was stated for the PSE configurations, separate configuration files can include global configuration files, application list configuration files, PSE IP configuration files, and the like. Again, separate configuration files for different parameters are organized into files including the files disclosed previously.

Various embodiments contemplate automatic configuration dump and configuration snapshots. The running configuration can be dumped to disk on application connectors and PSEs for use during disaster recovery. Systems save the running configuration from memory to disk (if anything has changed) periodically in at fixed intervals (i.e., every 15 minutes) considering current running configuration has reached a longer quiesce/quite state and is stable/unchanged for over a predetermined time interval (for example, 5 minutes). Systems are also adapted to maintain historical configuration snapshots on application connectors and PSEs for use during disaster recovery events for fallback purposes. Systems can create a daily configuration snapshot at a fixed time every day. The snapshot trigger time can be settable/ changeable via configuration override, defaulting to a set time every day (i.e., 2:00 AM every day). Embodiments include support for purposes of disaster recovery to allow simultaneously having multiple configuration versions being present on a system.

During a disaster recovery event, it may become necessary to use an older version of configuration if the current version of the configuration is corrupted or otherwise unsuitable for some other reasons. Thus, various embodiments include support for maintaining multiple configuration snapshots. Each disaster recovery configuration snapshot directory is formatted by embedding a timestamp into the directory name. Each system can maintain up to 15 daily prior configuration snapshots, both PSEs and application connectors periodically check and delete old configuration snapshots automatically that are older than a set interval (i.e., 15 days from current date).

Similarly, during a disaster recovery event, it may become necessary to use an older version of a binary if the current version of binary is unsuitable or incompatible with the version of configuration currently in use. Thus, embodiments support maintaining multiple binary snapshots. Each binary snapshot directory contains both the binary image file and the image version metadata file to encapsulate the state of a valid system binary. Each system can maintain up to 5 prior binary snapshots, both PSEs and application connectors will periodically check and delete old binary snapshots automatically that exceed total 5 binary snapshots limit and are older than a set time interval (i.e., 30 days). The configuration snapshot directory will contain a file with a running binary version inside the metadata file, this file will be copied into the daily snapshots directory to indicate what binary was used with the given configuration snapshot.

No policy is enforced when disaster recovery mode is active. Thus, user certificates are tested for signature validity, but not checked for certificate revocation, certificates have a validity of one year from the date they are issued/ enrolled. Recently terminated employees (up to the disaster recovery auth age) could have access to applications when in disaster recovery mode. Mitigation of this includes deleting the client certificate from client connectors for terminated employees to avoid this situation. SAML re-auth time is extended during disaster recovery mode. Thus, systems extend the validity of expired SAML assertion beyond its original validity by an additional 14 days, or other period, by default (relative to the start of validity date). Administrators have the option to extend validity of SAML assertion up to a total of additional 90 days. This assertion additional validity time is configurable via admin UI while the system (PSE) is still connected to the cloud. During active disaster recovery while the PSE is disconnected from the cloud (Broker) an administrator may manually extend the SAML assertion validity by editing local config file and putting a higher value for auth interval and manually restarting each PSE. Disaster recovery mode does not disable the cloud, when customer systems go into active disaster recovery mode they simply do not connect or use cloud services. Customers have the option to enable disaster recovery mode on a per-application segment basis. Only application segments marked for disaster recovery will be allowed access during disaster recovery mode. Only application connector groups and PSE groups marked for disaster recovery will be used in disaster recovery mode. Customers can use an "Allow Disaster Recovery" or "Allow Disaster Recovery Test Mode" configuration in the application profile to control which set of users are able to participate in disaster recovery mode.

Figure 24:
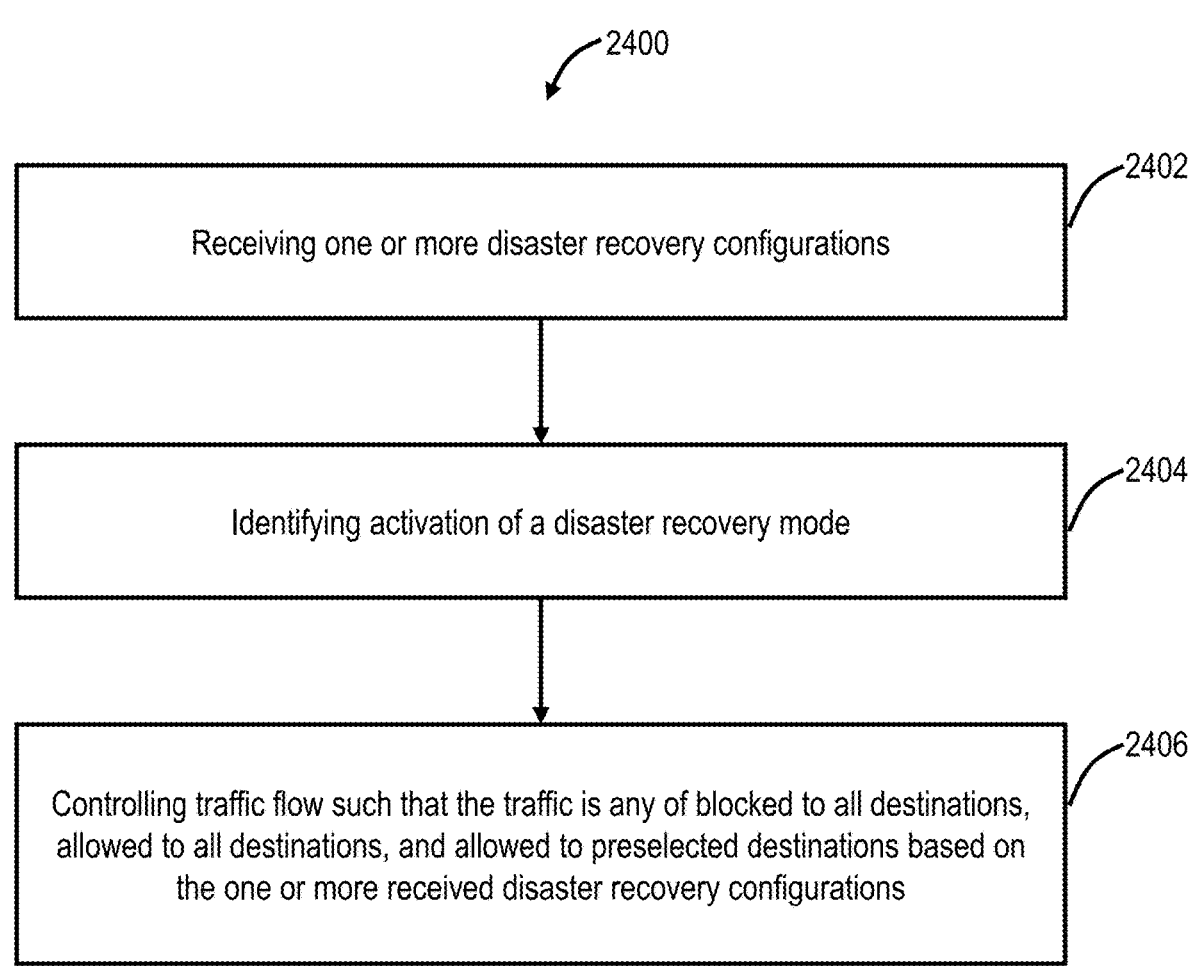
FIG. 24 is a flow chart of a process for disaster recovery for cloud-based monitoring of internet access.

FIG. 24 is a flow chart of a process 2400 for disaster recovery for cloud-based monitoring of internet access. The process 2400 includes receiving one or more disaster recovery configurations (step 2402); identifying activation of a disaster recovery mode (step 2404); and controlling traffic flow such that the traffic is any of blocked to all destinations, allowed to all destinations, and allowed to preselected destinations based on the one or more received disaster recovery configurations (step 2406).

The process 2400 further includes updating a cache based on the actions taken during activation of the disaster recovery mode. The one or more disaster recovery configurations can each be associated with one or more specific tenants of a cloud-based system. The one or more disaster recovery configurations include a list of global default destinations preselected by a cloud provider. The one or more disaster recovery configurations additionally include one or more customer defined destination lists. The one or more customer defined destination lists take priority over the list of global default destinations. The list of global default destinations and the customer defined destination lists include domains which are instructed to be one of blocked or allowed.

FIG. 25 is a flow chart of a process for disaster recovery for cloud-based private application access. The process 2500 includes receiving one or more disaster recovery configurations via a cloud-based system (step 2502); storing the one or more received disaster recovery configurations in one or more components of the cloud-based system (step 2504); identifying activation of a disaster recovery mode (step 2506); and providing private application access based on one or more disaster recovery configurations (step 2508).

The process 2500 further includes wherein the one or more disaster recovery configurations are each associated with one or more specific tenants of the cloud-based system. The one or more disaster recovery configurations include which components of the cloud-based system will be utilized during active disaster recovery mode. Private application access is only provided to disaster recovery applications specified in the one or more configurations. The one or more components of the cloud-based system update their stored configurations based on one or more new configurations. The one or more components of the cloud-based system store a plurality of configurations, and wherein any of the stored configurations can be used responsive to activation of the disaster recovery mode. The activation of the disaster recovery mode is one of automatically activated and activated by an administrator associated with a tenant.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read-Only Memory), an EPROM (Erasable Programmable Read-Only Memory), an EEPROM (Electrically Erasable Programmable Read-Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium including instructions that, when executed, cause one or more processors to perform steps of:

receiving one or more disaster recovery configurations;

identifying activation of a disaster recovery mode, wherein the disaster recovery mode is triggered based on detection that a cloud-based system is unavailable to perform security processing for network traffic associated with a user device, the detection comprising receipt of or query of a Domain Name System (DNS) record signaling the unavailability; and controlling traffic flow such that the traffic is any of blocked to all destinations, allowed to all destinations, and allowed to preselected destinations based on the one or more received disaster recovery configurations, wherein the disaster recovery configurations include preconfigured actions for the user device to perform local security processing based on cached policies when the cloud-based system is unavailable, the cached policies being dynamically updated based on prior cloud-enforced actions and tenant-specific configurations, and wherein conflicts between customer-defined and global default destination lists are deterministically resolved in favor of the customer-defined lists.

2. The non-transitory computer-readable medium of claim 1, wherein the steps further include:

updating a cache based on the actions taken during activation of the disaster recovery mode, wherein the actions include locally allowing or blocking traffic based on a previously cached policy when the cloud-based system is unavailable.

3. The non-transitory computer-readable medium of claim 1, wherein the one or more disaster recovery configurations are each associated with one or more specific tenants of a cloud-based system.

4. The non-transitory computer-readable medium of claim 1, wherein the one or more disaster recovery configurations include a list of global default destinations preselected by a cloud provider.

5. The non-transitory computer-readable medium of claim 4, wherein the one or more disaster recovery configurations additionally include one or more customer defined destination lists.

6. The non-transitory computer-readable medium of claim 5, wherein the one or more customer defined destination lists take priority over the list of global default destinations, and wherein conflicting entries between the lists are resolved in favor of the customer defined destination lists.

7. The non-transitory computer-readable medium of claim 5, wherein the list of global default destinations and the customer defined destination lists include domains which are instructed to be one of blocked or allowed.

8. A cloud-based system comprising:

one or more processors; and memory storing computer-executable instructions, wherein the computer-executable instructions cause the one or more processors to:

receive one or more disaster recovery configurations;

identify activation of a disaster recovery mode, wherein the disaster recovery mode is triggered based on detection that the cloud-based system is unavailable to perform security processing for network traffic associated with a user device, the detection comprising receipt of or query of a Domain Name System (DNS) record signaling the unavailability; and control traffic flow such that the traffic is any of blocked to all destinations, allowed to all destinations, and allowed to preselected destinations based on the one or more received disaster recovery configurations, wherein the disaster recovery configurations include preconfigured actions for the user device to perform local security processing based on cached policies when the cloud-based system is unavailable, the cached policies being dynamically updated based on prior cloud-enforced actions and tenant-specific configurations, and wherein conflicts between customer-defined and global default destination lists are deterministically resolved in favor of the customer-defined lists.

9. The cloud-based system of claim 8, wherein the steps further include:

updating a cache based on the actions taken during activation of the disaster recovery mode, wherein the actions include locally allowing or blocking traffic based on a previously cached policy when the cloud-based system is unavailable.

10. The cloud-based system of claim 8, wherein the one or more disaster recovery configurations are each associated with one or more specific tenants of a cloud-based system.

11. The cloud-based system of claim 8, wherein the one or more disaster recovery configurations include a list of global default destinations preselected by a cloud provider.

12. The cloud-based system of claim 11, wherein the one or more disaster recovery configurations additionally include one or more customer defined destination lists.

13. The cloud-based system of claim 12, wherein the one or more customer defined destination lists take priority over the list of global default destinations, and wherein conflicting entries between the lists are resolved in favor of the customer defined destination lists.

14. The cloud-based system of claim 12, wherein the list of global default destinations and the customer defined destination lists include domains which are instructed to be one of blocked or allowed.

15. A method comprising steps of:

receiving one or more disaster recovery configurations;

identifying activation of a disaster recovery mode, wherein the disaster recovery mode is triggered based on detection that a cloud-based system is unavailable to perform security processing for network traffic associated with a user device, the detection comprising receipt of or query of a Domain Name System (DNS) record signaling the unavailability; and controlling traffic flow such that the traffic is any of blocked to all destinations, allowed to all destinations, and allowed to preselected destinations based on the one or more received disaster recovery configurations, wherein the disaster recovery configurations include preconfigured actions for the user device to perform local security processing based on cached policies when the cloud-based system is unavailable, the cached policies being dynamically updated based on prior cloud-enforced actions and tenant-specific configurations, and wherein conflicts between customer-defined and global default destination lists are deterministically resolved in favor of the customer-defined lists.

16. The method of claim 15, wherein the steps further include:

updating a cache based on the actions taken during activation of the disaster recovery mode, wherein the actions include locally allowing or blocking traffic based on a previously cached policy when the cloud-based system is unavailable.

17. The method of claim 15, wherein the one or more disaster recovery configurations are each associated with one or more specific tenants of a cloud-based system.

18. The method of claim 15, wherein the one or more disaster recovery configurations include a list of global default destinations preselected by a cloud provider.

19. The method of claim 18, wherein the one or more disaster recovery configurations additionally include one or more customer defined destination lists.

20. The method of claim 19, wherein the one or more customer defined destination lists take priority over the list of global default destinations, and wherein conflicting entries between the lists are resolved in favor of the customer defined destination lists.

* * * * *